(12) United States Patent
Yamaguchi et al.

(10) Patent No.: US 10,986,721 B2
(45) Date of Patent: Apr. 20, 2021

(54) REPLACEMENT PART UNIT FOR PLASMA TORCH, ELECTRODE, INSULATING GUIDE, AND NOZZLE

(71) Applicant: KOMATSU INDUSTRIES CORPORATION, Kanazawa (JP)

(72) Inventors: Yoshihiro Yamaguchi, Kaga (JP); Keita Kondo, Komatsu (JP); Shigeo Morimoto, Yokohama (JP); Katsuo Saio, Hiratsuka (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 840 days.

(21) Appl. No.: 15/325,223

(22) PCT Filed: Dec. 4, 2015

(86) PCT No.: PCT/JP2015/084162
§ 371 (c)(1),
(2) Date: Jan. 10, 2017

(87) PCT Pub. No.: WO2016/121228
PCT Pub. Date: Aug. 4, 2016

(65) Prior Publication Data
US 2017/0188445 A1  Jun. 29, 2017

(30) Foreign Application Priority Data

Jan. 30, 2015  (JP) .............................. JP2015-017680

(51) Int. Cl.
*H05H 1/34*   (2006.01)
*B23K 10/00*  (2006.01)
*H05H 1/28*   (2006.01)

(52) U.S. Cl.
CPC .............. *H05H 1/34* (2013.01); *B23K 10/00* (2013.01); *H05H 1/28* (2013.01);
(Continued)

(58) Field of Classification Search
CPC ... H05H 1/34; H05H 2001/3457; B23K 10/00
See application file for complete search history.

(56) References Cited

U.S. PATENT DOCUMENTS

| 4,682,005 A | 7/1987 | Marhic |
| 4,914,271 A | 4/1990 | Delzenne et al. |

(Continued)

FOREIGN PATENT DOCUMENTS

| CN | 104319277 A | 1/2015 |
| CN | 104656325 A | 5/2015 |

(Continued)

OTHER PUBLICATIONS

The International Search Report for the corresponding international application No. PCT/JP2015/084162, dated Feb. 23, 2016.
(Continued)

*Primary Examiner* — Dana Ross
*Assistant Examiner* — Lawrence H Samuels
(74) *Attorney, Agent, or Firm* — Global IP Counselors, LLP

(57) ABSTRACT

A replacement part unit for a plasma torch includes an electrode, an insulation guide, and a nozzle. The insulation guide includes a hole into which the electrode is inserted. The insulation guide is coupled to the electrode by press-fitting or adhesion. The nozzle includes a hole into which the insulation guide is inserted. The nozzle is coupled to the insulation guide by press-fitting or adhesion.

37 Claims, 36 Drawing Sheets

(52) U.S. Cl.
CPC .............. *H05H 2001/3436* (2013.01); *H05H 2001/3468* (2013.01); *H05H 2001/3478* (2013.01)

(56) References Cited

U.S. PATENT DOCUMENTS

| | | | |
|---|---|---|---|
| 5,726,415 A * | 3/1998 | Luo | B23K 10/00 219/121.48 |
| 6,093,907 A | 7/2000 | Hidaka | |
| 6,320,156 B1 * | 11/2001 | Yamaguchi | H05H 1/34 |
| 6,914,211 B2 * | 7/2005 | Brasseur | B23K 10/00 219/121.48 |
| 8,420,975 B2 * | 4/2013 | Yamaguchi | H05H 1/34 219/121.48 |
| 9,024,228 B2 * | 5/2015 | Yamaguchi | H05H 1/28 219/121.49 |
| 9,516,737 B2 * | 12/2016 | Yamaguchi | B23K 10/006 |
| 10,232,460 B2 * | 3/2019 | Yamaguchi | B23K 10/00 |
| 2004/0026394 A1 * | 2/2004 | Giese | B23K 9/295 219/137.42 |
| 2004/0239838 A1 | 12/2004 | Lai | |
| 2006/0102606 A1 * | 5/2006 | Twarog | H05H 1/34 219/121.82 |
| 2008/0083708 A1 * | 4/2008 | Hussary | H05H 1/34 219/121.5 |
| 2008/0086042 A1 * | 4/2008 | Brister | A61B 5/14532 600/347 |
| 2008/0093346 A1 * | 4/2008 | Yamaguchi | H05H 1/28 219/121.49 |
| 2008/0210669 A1 | 9/2008 | Yang et al. | |
| 2009/0230095 A1 * | 9/2009 | Liebold | B23K 9/296 219/121.5 |
| 2009/0230097 A1 | 9/2009 | Liebold et al. | |
| 2010/0155373 A1 * | 6/2010 | Yamaguchi | H05H 1/34 219/121.5 |
| 2012/0145680 A1 * | 6/2012 | Warren, Jr. | B23K 10/00 219/121.44 |
| 2015/0076123 A1 * | 3/2015 | Reinke | H05H 1/34 219/121.52 |
| 2015/0129562 A1 | 5/2015 | Severance, Jr. | |
| 2015/0296605 A1 * | 10/2015 | Yamaguchi | B23K 10/006 219/121.44 |
| 2016/0116797 A1 | 4/2016 | Itou et al. | |
| 2016/0120014 A1 * | 4/2016 | Laurisch | H05H 1/34 219/121.59 |
| 2016/0266425 A1 | 9/2016 | Xiong | |
| 2017/0045767 A1 | 2/2017 | Xu et al. | |
| 2018/0031877 A1 | 2/2018 | Li | |

FOREIGN PATENT DOCUMENTS

| | | |
|---|---|---|
| CN | 105404048 A | 3/2016 |
| FR | 3 000 866 A1 | 7/2014 |
| JP | 61-195787 A | 8/1986 |
| JP | 63-53374 U | 4/1988 |
| JP | 2-6072 A | 1/1990 |
| JP | 9-63790 A | 3/1997 |
| JP | 9-141446 A | 6/1997 |
| JP | 9-253862 A | 9/1997 |
| JP | 9-285868 A | 11/1997 |
| JP | 2000-317641 A | 11/2000 |
| JP | 3075166 U | 11/2000 |
| JP | 2001-47247 A | 2/2001 |
| JP | 2002-86274 A | 3/2002 |
| JP | 2005-324205 A | 11/2005 |
| JP | 2007-125568 A | 5/2007 |
| JP | 2011-513072 A | 4/2011 |
| KR | 10-2009-0108705 A | 10/2009 |
| TW | 200426483 A | 12/2004 |
| WO | 96/25266 A1 | 8/1996 |
| WO | 97/12715 A1 | 4/1997 |
| WO | 2014/104092 A1 | 7/2014 |
| WO | WO-2014184656 A2 * | 11/2014 |

OTHER PUBLICATIONS

The Office Action for the corresponding Korean application No. 10-2016-7036202, dated May 24, 2018.
The Office Action for the corresponding Japanese application No. 2015-017680, dated Apr. 2, 2019.
The Office Action for the corresponding Chinese application No. 201580035330.7, dated Jul. 26, 2019.
The Office Action for the corresponding Chinese application No. 201580035330.7, dated Apr. 19, 2019.
The Office Action of the corresponding Japanese application No. 2019-177342, dated Jul. 21, 2020.
The Office Action of the corresponding Japanese application No. 2019-177342, dated Feb. 24, 2021.

* cited by examiner

REPLACEMENT PART UNIT FOR PLASMA TORCH, ELECTRODE, INSULATING GUIDE, AND NOZZLE

CROSS-REFERENCE TO RELATED APPLICATIONS

This application is a U.S. National stage application of International Application No. PCT/JP2015/084162, filed on Dec. 4, 2015. This U.S. National stage application claims priority under 35 U.S.C. § 119(a) to Japanese Patent Application No. 2015-017680, filed in Japan on Jan. 30, 2015, the entire contents of which are hereby incorporated herein by reference.

BACKGROUND

Field of the Invention

The present invention relates to a replacement part unit for plasma torch, an electrode, an insulation guide, and a nozzle.

Background Information

A plasma arc is generated with a plasma torch by forming an arc between an electrode and a workpiece (material to be cut) and narrowing the arc with a nozzle to form a high-temperature high-speed jet flow suited for cutting. As a result, the electrode and the nozzle both need to be electrically insulated. Moreover, in order to achieve good cutting quality, it is important to form a jet flow that is symmetrical around the central axis of the torch. As a result, the central axes of the electrode and the nozzle need to match each other.

As described in Japanese Patent Laid-open No. 2001-47247 for example, a plasma torch includes an electrode that acts as the originating point of the arc, and a nozzle disposed so as to cover the electrode. The electrode is attached to an electrode seat of a torch body. The nozzle is attached to the electrode via an insulation guide. The insulation guide positions the nozzle so that the nozzle is disposed concentrically with the electrode. The plasma torch causes a plasma arc to be generated between the electrode and a workpiece through an orifice of the nozzle.

The electrode, the insulation guide, and the nozzle are consumables and therefore are detachably attached to each other in a manner that facilitates replacement by manual labor. Moreover, O-rings are disposed respectively between the electrode and the insulation guide and between the insulation guide and the nozzle. As a result, cooling water or plasma gas is sealed therein.

SUMMARY

The concentricity of the electrode and the nozzle affects the quality of the plasma cutting. However, gaps are present between each of the parts because the electrode, the insulation guide, and the nozzle are detachably attached with each other by hand in the above plasma torch. Displacement in the center positions of the electrode and the nozzle may occur due to the aforementioned gaps.

Alternatively, when O-rings are used, a pressing allowance for a water seal or a gas seal is provided in the O-ring in order to allow the nozzle or electrode to be taken in and out by hand. However, in order to allow the nozzle or electrode to be taken in and out by hand, the adhesion force of the pressing allowance of the O-ring cannot be large. Therefore, the securing method using an O-ring cannot be a firm securing method that prevents positional displacement.

Moreover, when pressing the nozzle, the guide, and the electrode onto the torch body by fastening a retainer cap thereon, the O-ring may be deformed unevenly due to the force from the twisting. In this case, displacement in the center positions of the electrode and the nozzle may occur.

Furthermore, the electrode, the insulation guide, and the nozzle are replaced individually in the above plasma torch. For example, when replacing the electrode, the nozzle and the insulation guide are removed from the electrode, and after the electrode is replaced, the nozzle and the insulation guide are attached. As a result, the work for replacing the parts is complicated. Further, the concentricity of the electrode and the nozzle may be affected by replacing the parts.

An object of the present invention is to be able to improve concentricity between an electrode and a nozzle and to provide a replacement part unit for a plasma torch, an electrode, an insulation guide, and a nozzle that can be replaced easily.

A replacement part unit for a plasma torch according to a first aspect of the present invention includes an electrode, an insulation guide, and a nozzle. The insulation guide includes a hole into which the electrode is inserted. The insulation guide is coupled to the electrode by press-fitting or adhesion. The nozzle includes a hole into which the insulation guide is inserted. The nozzle is coupled to the insulation guide by press-fitting or adhesion.

According to the replacement part unit for a plasma torch as in the present aspect, the electrode, the insulation guide, and the nozzle are coupled without being easily separated. As a result, the electrode, the insulation guide, and the nozzle can be easily replaced by replacing the replacement part unit. Further, because the electrode, the insulation guide, and the nozzle are coupled by press-fitting or adhesion, the electrode, the insulation guide, and the nozzle can be coupled without gaps due to the use of O-rings. Accordingly, the concentricity of the electrode and the nozzle can be improved.

The external circumferential surface of the electrode may have an uneven shape that engages with the internal circumferential surface of the insulation guide.

The internal circumferential surface of the insulation guide may have an uneven shape that engages with the external circumferential surface of the electrode.

The external circumferential surface of the insulation guide may have an uneven shape that engages with the internal circumferential surface of the nozzle.

The internal circumferential surface of the nozzle may have an uneven shape that engages with the external circumferential surface of the insulation guide.

The electrode and the insulation guide may be coupled so as to seal a fluid without an O-ring.

The insulation guide and the nozzle may be coupled so as to seal a fluid without an O-ring.

The insulation guide may be formed with a material having a modulus of elasticity that is less than the modulus of elasticity of a ceramic.

The insulation guide may be made of a resin.

The electrode may include a coupling portion and a flange portion. The coupling portion may be coupled to the insulation guide. The flange portion may have an outer diameter greater than that of the coupling portion and may include a base end of the electrode.

The external circumferential surface of the flange portion may include a seal surface that comes into contact with an O-ring.

The flange portion may be longer than the coupling portion in the axial direction of the electrode.

The external circumferential surface of the insulation guide may include a first external circumferential surface and a second external circumferential surface. The first external circumferential surface may be disposed inside the nozzle and may be coupled to the nozzle. The second external circumferential surface may be positioned on the base end side of the first external circumferential surface and may be disposed outside of the nozzle. The first external circumferential surface may be shorter than the second external circumferential surface in the axial direction of the insulation guide.

The second external circumferential surface may include a seal surface that comes into contact with an O-ring.

A portion of the second external circumferential surface closer to a tip end side than the seal surface may be disposed inside a cooling water channel of the plasma torch.

The external circumferential surface of the insulation guide may include a third external circumferential surface. The third external circumferential surface may be positioned on the base end side of the second external circumferential surface and may have an outer diameter smaller than that of the second external circumferential surface. The third external circumferential surface may be disposed inside a gas channel of the plasma torch.

The nozzle may include a first nozzle portion and a second nozzle portion. The first nozzle portion may be coupled to the insulation guide. The second nozzle portion may be positioned on the tip end side of the first nozzle portion, may have a thickness in the radial direction greater than that of the first nozzle portion, and may face the electrode. The second nozzle portion may be longer than the first nozzle portion in the axial direction of the nozzle.

The base end portion of the nozzle may be disposed inside the cooling water channel of the plasma torch.

The external circumferential surface of the nozzle may include a recessed portion that is recessed toward the inside in the radial direction and that extends in the circumferential direction.

The recessed portion may be disposed at approximately the same position as the tip end of the electrode in the axial direction of the nozzle.

The plasma torch may include a retainer cap disposed so as to cover the nozzle. The recessed portion may be disposed inside the cooling water channel between the internal circumferential surface of the retainer cap and the external circumferential surface of the nozzle. A hole that communicates with the cooling water channel may be provided in the retainer cap. The recessed portion may be disposed at approximately the same position as the hole of the retainer cap in the axial direction of the nozzle.

A wall surface on the base end side of the recessed portion may be inclined with respect to the radial direction of the nozzle and may extend parallel to the internal circumferential surface of the retainer cap.

The wall surface on the tip end side of the recessed portion may extend in the radial direction of the nozzle.

The replacement part unit for a plasma torch may further include an insulation ring and a shield cap. The insulation ring may include a hole into which the nozzle is inserted and may be coupled by press-fitting or adhesion to the nozzle. The shield cap may include a hole into which the insulation ring is inserted and may be coupled by press-fitting or adhesion to the insulation ring.

An electrode according to a second aspect of the present invention is an electrode for a plasma torch including an insulation guide and a nozzle. The insulation guide includes a hole into which the electrode is inserted. The nozzle include a hole into which the insulation guide is inserted. The electrode includes an electrode body portion and a coupling portion. The electrode body portion includes a tip end of the electrode. The coupling portion is positioned on the base end side of the electrode body portion. The coupling portion is coupled to the insulation guide by press-fitting or adhesion.

The electrode according to the present aspect is coupled to the insulation guide in a manner that does not easily allow separation. As a result, the electrode and the insulation guide can be easily replaced in an integrated manner. Further, because the electrode and the insulation guide are coupled by press-fitting or adhesion, the electrode and the insulation guide can be coupled without a gap due to the use of an O-ring. Accordingly, the concentricity of the electrode and the insulation guide can be improved. Consequently, the concentricity of the electrode and the nozzle can be improved.

The external circumferential surface of the coupling portion may have an uneven shape that engages with the internal circumferential surface of the insulation guide.

The coupling portion may be coupled to the insulation guide so as to seal a fluid without an O-ring.

The electrode may further include a flange portion. The flange portion may have an outer diameter greater than that of the coupling portion and may include a base end of the electrode.

The external circumferential surface of the flange portion may include a seal surface that is in contact with an O-ring.

The flange portion may be longer than the coupling portion in the axial direction of the electrode.

An insulation guide according to a third aspect of the present invention is an insulation guide for a plasma torch including an electrode and a nozzle. The nozzle includes a hole into which the insulation guide is inserted. The insulation guide includes a first coupling portion and a second coupling portion. The first coupling portion is coupled to the electrode by press-fitting or adhesion. The second coupling portion is coupled to the nozzle by press-fitting or adhesion.

According to the insulation guide as in the present aspect, the electrode and the insulation guide are coupled without being easily separated. As a result, the electrode, the insulation guide, and the nozzle can be replaced in an integrated manner as a replacement part unit. Consequently, the electrode, the insulation guide, and the nozzle can be replaced easily. Further, because the electrode, the insulation guide, and the nozzle are coupled by press-fitting or adhesion, the electrode, the insulation guide, and the nozzle can be coupled without gaps due to the use of O-rings. Accordingly, the concentricity of the electrode and the nozzle can be improved.

The first coupling portion of the insulation guide may have an uneven shape that engages with the external circumferential surface of the electrode.

The second coupling portion of the insulation guide may have an uneven shape that engages with the internal circumferential surface of the nozzle.

The first coupling portion of the insulation guide may be coupled to the electrode so as to seal a fluid without an O-ring.

The second coupling portion of the insulation guide may be coupled to the nozzle so as to seal a fluid without an O-ring.

The insulation guide may be formed with a material having a modulus of elasticity that is less than the modulus of elasticity of a ceramic.

The insulation guide may be made of a resin.

The external circumferential surface of the insulation guide may include a first external circumferential surface and a second external circumferential surface. The first external circumferential surface may be disposed inside the nozzle and may include the second coupling portion. The second external circumferential surface may be positioned on the base end side of the first external circumferential surface and may be disposed outside of the nozzle. The first external circumferential surface may be shorter than the second external circumferential surface in the axial direction of the insulation guide.

The second external circumferential surface may include a seal surface that comes into contact with an O-ring.

A portion of the second external circumferential surface on the tip end side of the seal surface may be disposed inside a cooling water channel of the plasma torch.

The external circumferential surface of the insulation guide may further include a third external circumferential surface. The third external circumferential surface may be positioned on the base end side of the second external circumferential surface and may have an outer diameter smaller than that of the second external circumferential surface. The third external circumferential surface may be disposed inside a gas channel of the plasma torch.

A nozzle according to a fourth aspect of the present invention is nozzle for a plasma torch including an electrode and an insulation guide. The insulation guide includes a hole into which the electrode is inserted. The nozzle includes a first nozzle portion, a second nozzle portion, and a third nozzle portion. The first nozzle portion includes a first hole into which the insulation guide is inserted. The first nozzle portion is coupled to the insulation guide by press-fitting or adhesion. The second nozzle portion includes a second hole that communicates with the first hole. The second nozzle portion is positioned on the tip end side of the first nozzle portion. The third nozzle portion includes a jetting hole. The jetting hole communicates with the second hole and has an internal diameter smaller than that of the second hole. The third nozzle portion is positioned on the tip end side of the second nozzle portion.

The nozzle according to the present aspect is coupled to the insulation guide in a manner that does not easily allow separation. As a result, the nozzle and the insulation guide can be easily replaced in an integrated manner. Further, because the nozzle and the insulation guide are coupled by press-fitting or adhesion, the nozzle and the insulation guide can be coupled without a gap due to the use of an O-ring. Accordingly, the concentricity of the nozzle and the insulation guide can be improved. Consequently, the concentricity of the electrode and the nozzle can be improved.

The internal circumferential surface of the first nozzle portion may have an uneven shape that engages with the external circumferential surface of the insulation guide.

The internal circumferential surface of the first nozzle portion may be coupled to the insulation guide so as to seal a fluid without an O-ring.

The second nozzle portion may have a thickness in the radial direction greater than that of the first nozzle portion and may face the electrode. The second nozzle portion may be longer than the first nozzle portion in the axial direction of the nozzle.

The base end portion of the nozzle may be disposed inside the cooling water channel of the plasma torch.

The external circumferential surface of the nozzle may include a recessed portion that is recessed toward the inside in the radial direction and that extends in the circumferential direction.

The recessed portion may be disposed at approximately the same position as the tip end of the electrode in the axial direction of the nozzle.

The plasma torch may include a retainer cap disposed so as to cover the nozzle. The recessed portion may be disposed inside the cooling water channel between the internal circumferential surface of the retainer cap and the external circumferential surface of the nozzle. A hole that communicates with the cooling water channel may be provided in the retainer cap. The recessed portion may be disposed at approximately the same position as the hole of the retainer cap in the axial direction of the nozzle.

A wall surface on the base end side of the recessed portion may be inclined with respect to the radial direction of the nozzle and may extend parallel to the internal circumferential surface of the retainer cap.

A wall surface on the tip end side of the recessed portion may extend in the radial direction of the nozzle.

The plasma torch may include a first retainer cap and a second retainer cap. The first retainer cap may include an opening into which the replacement part unit for a plasma torch is inserted, and may be disposed so as to cover the nozzle. The second retainer cap may include an opening into which the replacement part unit for a plasma torch is inserted, and may be attached to the first retainer cap disposed so as to cover the first retainer cap. The nozzle or the shield cap may include a flange portion. The flange portion may be held by being clamped between an edge portion of the opening of the first retainer cap and an edge portion of the opening of the second retainer cap.

Effects of Invention

According to the present invention, concentricity between the electrode and the nozzle can be improved and the replacement part unit for a plasma torch, the electrode, the insulation guide, and the nozzle that can be replaced easily can be provided.

DETAILED DESCRIPTION OF EMBODIMENT(S)

1. First Embodiment 1.1 Plasma Torch Configuration

Figure 1:
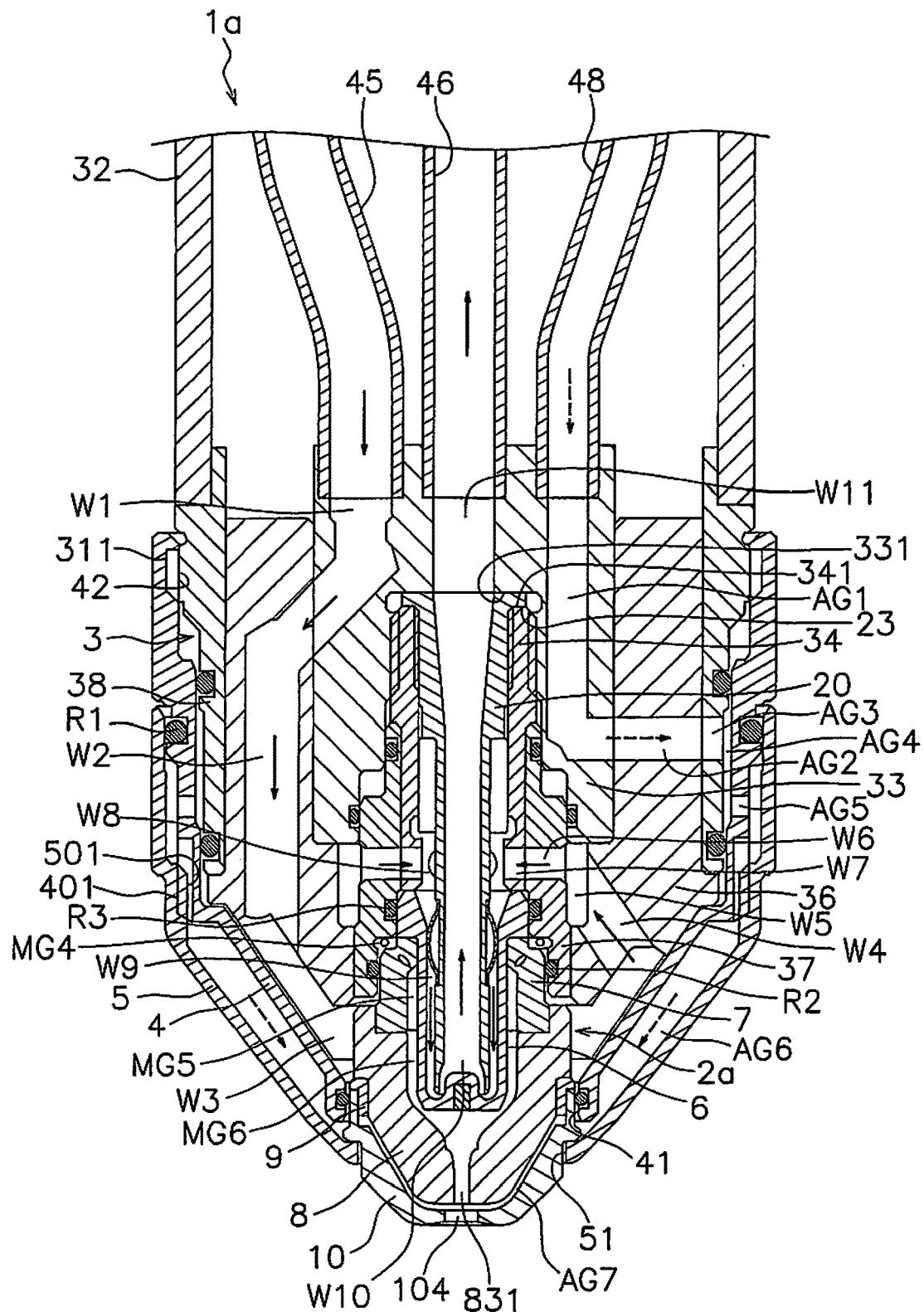
FIG. 1 is a cross-sectional view along the center axis of a plasma torch according to a first embodiment.
Figure 2:
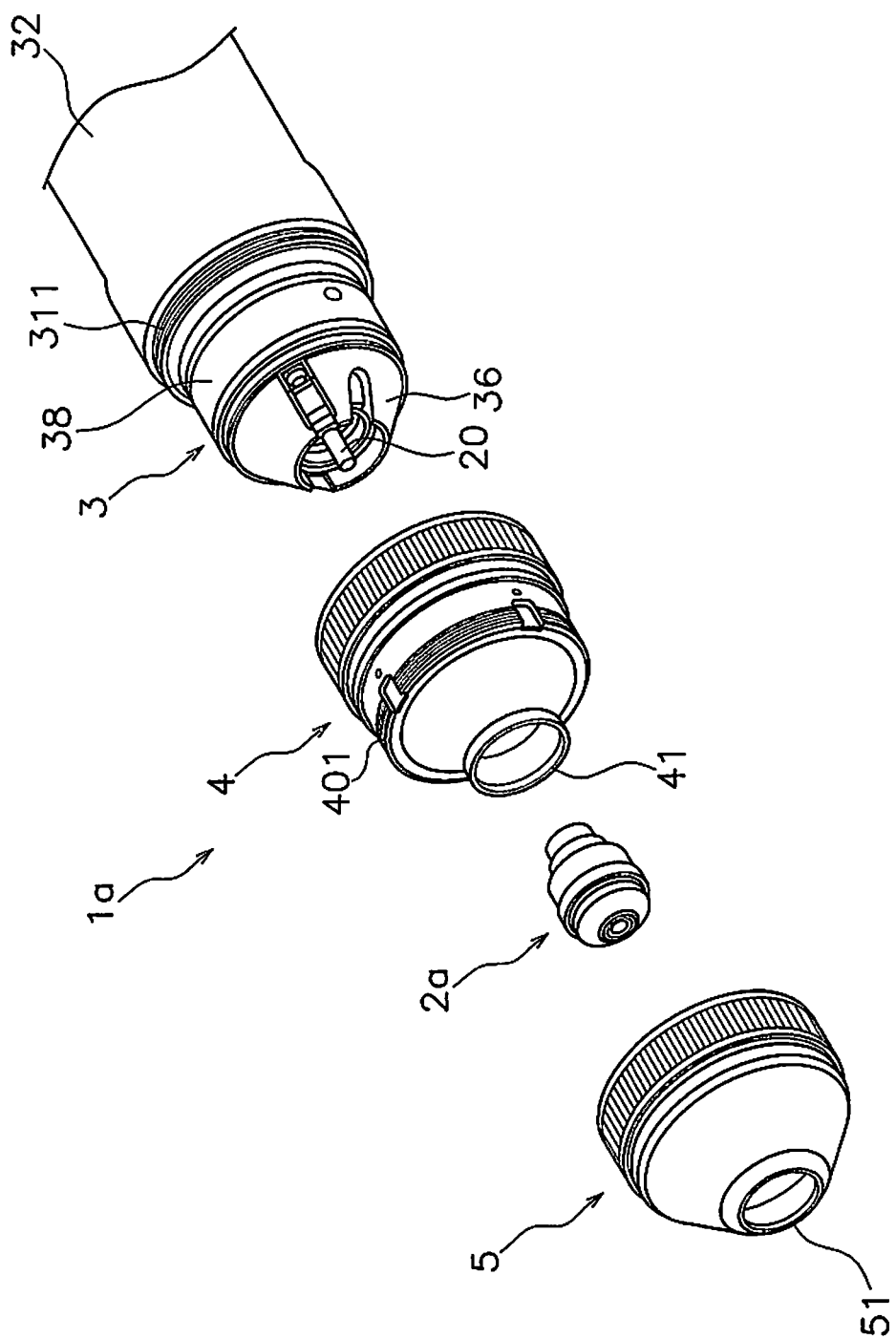
FIG. 2 is an exploded view of the plasma torch.

A plasma torch according to the embodiments will be discussed below with reference to the drawings. FIG. 1 is a cross-sectional view along the center axis of a plasma torch 1*a* according to a first embodiment. FIG. 2 is an exploded view of the plasma torch 1*a*. The plasma torch 1*a* according to the present embodiment is a plasma torch 1*a* for oxygen plasma cutting. However, the plasma torch 1*a* may be a plasma torch for plasma cutting using a gas that does not include oxygen such as nitrogen or argon.

As illustrated in FIG. 2, the plasma torch 1*a* includes a replacement part unit 2*a*, a torch body 3, a first retainer cap 4, and a second retainer cap 5. The replacement part unit 2*a*, the first retainer cap 4, and the second retainer cap 5 are disposed concentrically on the center axis of the torch body 3.

As illustrated in FIG. 1, the replacement part unit 2*a* is attached to the torch body 3. The replacement part unit 2*a* includes an electrode 6, an insulation guide 7, a nozzle 8, an insulation ring 9, and a shield cap 10. Details of the replacement part unit 2*a* are discussed below.

The torch body 3 is attached to a connecting pipe 32 via a fixing ring 31. The torch body 3 includes a base portion 33, an electrode seat 34, a center pipe 20, a nozzle seat 36, an insulation sleeve 37, and a holder 38. The base portion 33, the electrode seat 34, the center pipe 20, the nozzle seat 36, the insulation sleeve 37, and the holder 38 are disposed concentrically on the center axis of the torch body 3.

The base portion 33 has a cylindrical shape. The base portion 33 is formed with an electrically conductive body. The center pipe 20, the electrode seat 34, and the insulation sleeve 37 are inserted into a hole of the base portion 33. The electrode seat 34 has a cylindrical shape. The electrode seat 34 is formed with an electrically conductive body. The base portion 33 is electrically connected to a cable from a power source that is not illustrated in the drawings.

The center pipe 20 is inserted into a hole of the electrode seat 34. The center pipe 20 has a tube-like shape. The center pipe 20 is formed with an electrically conductive body. The tip end of the center pipe 20 protrudes from the tip end of the nozzle seat 36. The center pipe 20 is explained in detail below.

The insulation sleeve 37 has a cylindrical shape. The insulation sleeve 37 is formed with an electrically conductive body. A portion of the insulation sleeve 37 is disposed inside the hole of the base portion 33. The insulation sleeve 37 is disposed between the electrode seat 34 and the nozzle seat 36.

The nozzle seat 36 has a cylindrical shape. The tip end portion of the nozzle seat 36 has a tapered shape. The nozzle seat 36 is formed with an insulating body. A contact piece (not illustrated) which electrically contacts the nozzle is attached to the nozzle seat 36. The contact piece is electrically connected to the cable from the power source. The base portion 33 is inserted into a hole of the nozzle seat 36. The insulation sleeve 37 is inserted into the hole of the nozzle seat 36. A tip end portion of the insulation sleeve 37 protrudes from the base portion 33 and is disposed inside the hole of the nozzle seat 36.

The holder 38 has a cylindrical shape. The holder 38 is attached to the connecting pipe 32 by a means such as adhesion. The nozzle seat 36 is inserted into a hole of the holder 38. The tip end portion of the nozzle seat 36 protrudes from the holder 38.

The first retainer cap 4 has a cylindrical shape in which the tip end portion is tapered. The first retainer cap 4 is attached to the torch body 3 so as to cover the nozzle seat 36. The tip end portion of the first retainer cap 4 includes an opening 41 into which the shield cap 10 is inserted. The holder 38 and the nozzle seat 36 are disposed inside the first retainer cap 4. The external circumferential surface of the holder 38 is provided with a male thread portion 311. A female thread portion 42 is provided on the internal circumferential surface of the base end portion of the first retainer cap 4. The first retainer cap 4 is attached to the torch body 3 by screwing the male thread portion 311 of the holder 38 onto the female thread portion 42 of the first retainer cap 4.

The second retainer cap 5 has a cylindrical shape in which the tip end portion is tapered. The tip end portion of the second retainer cap 5 includes an opening 51 into which the shield cap 10 is inserted. The second retainer cap 5 is attached to the first retainer cap 4 so as to cover the first retainer cap 4. The first retainer cap 4 is disposed inside the second retainer cap 5. The first retainer cap 4 and the second retainer cap 5 clamp and hold the replacement part unit 2*a*. An O-ring R1 is disposed on the external circumferential surface of the first retainer cap 4. A male thread 401 is provided on the external circumferential surface of the first retainer cap 4, and a female thread 501 is provided on the internal circumferential surface of the second retainer cap 5. The second retainer cap 5 is attached to the first retainer cap 4 by screwing the male thread 401 of the first retainer cap 4 onto the female thread 501 of the second retainer cap 5.

1.2 Replacement Part Unit Configuration

Figure 3:
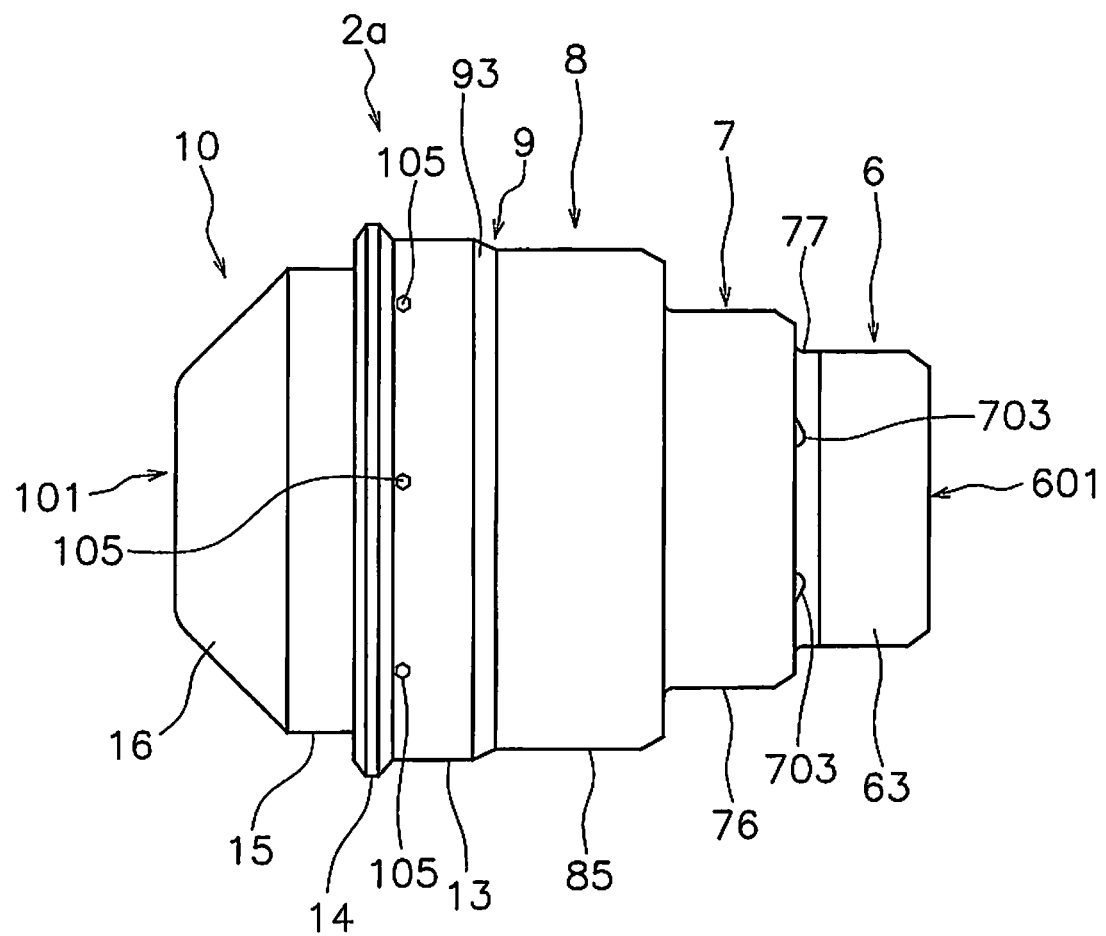
FIG. 3 is a side view of a replacement part unit.
Figure 4:
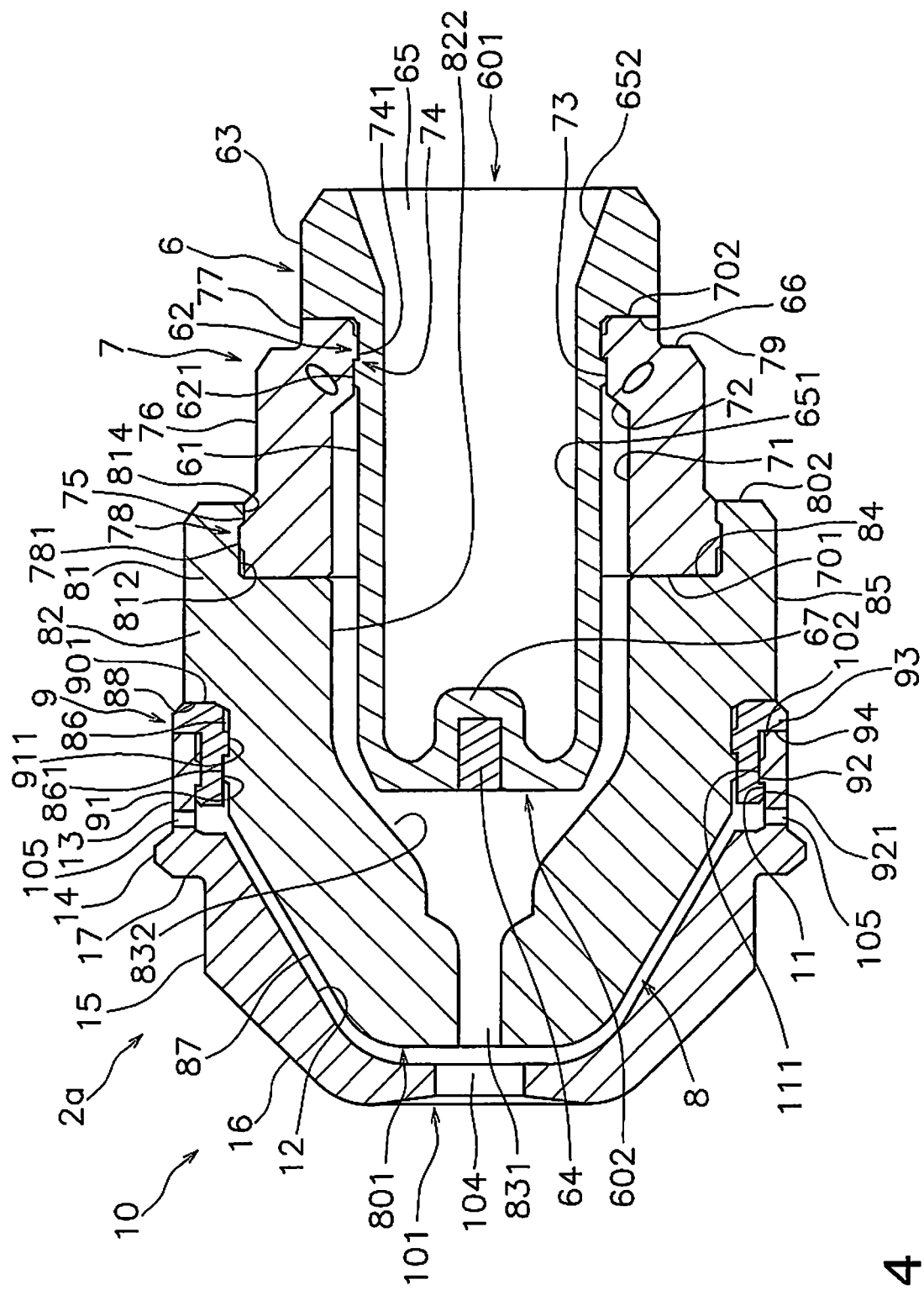
FIG. 4 is a cross-sectional view along the center axis of the replacement part unit.

Details of the replacement part unit 2a are discussed below. FIG. 3 is a side view of the replacement part unit 2a. FIG. 4 is a cross-sectional view along the center axis of the replacement part unit 2a.

As illustrated in FIGS. 3 and 4, the replacement part unit 2a is a unit in which the electrode 6, the insulation guide 7, the nozzle 8, the insulation ring 9, and the shield cap 10 are integrated by press-fitting. The electrode 6, the insulation guide 7, the nozzle 8, the insulation ring 9, and the shield cap 10 are disposed concentrically with each other. Because the replacement part unit 2a is disposed concentrically with the center axis of the torch body 3, the center axes of the respective electrode 6, the insulation guide 7, the nozzle 8, the insulation ring 9, and the shield cap 10 match the center axis of the torch body 3.

Figure 5:
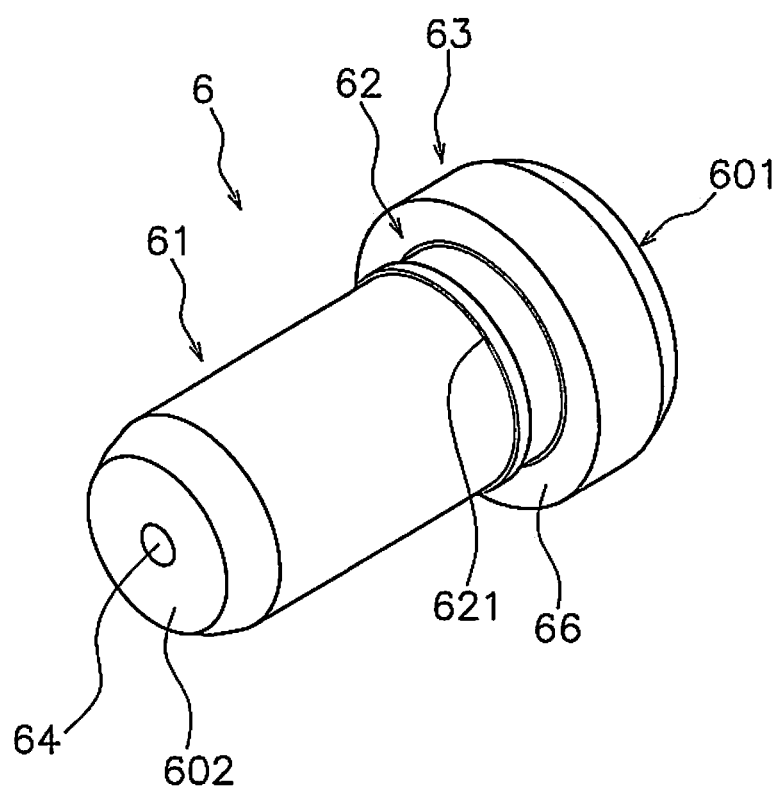
FIG. 5 is a perspective view of an electrode.
Figure 6:
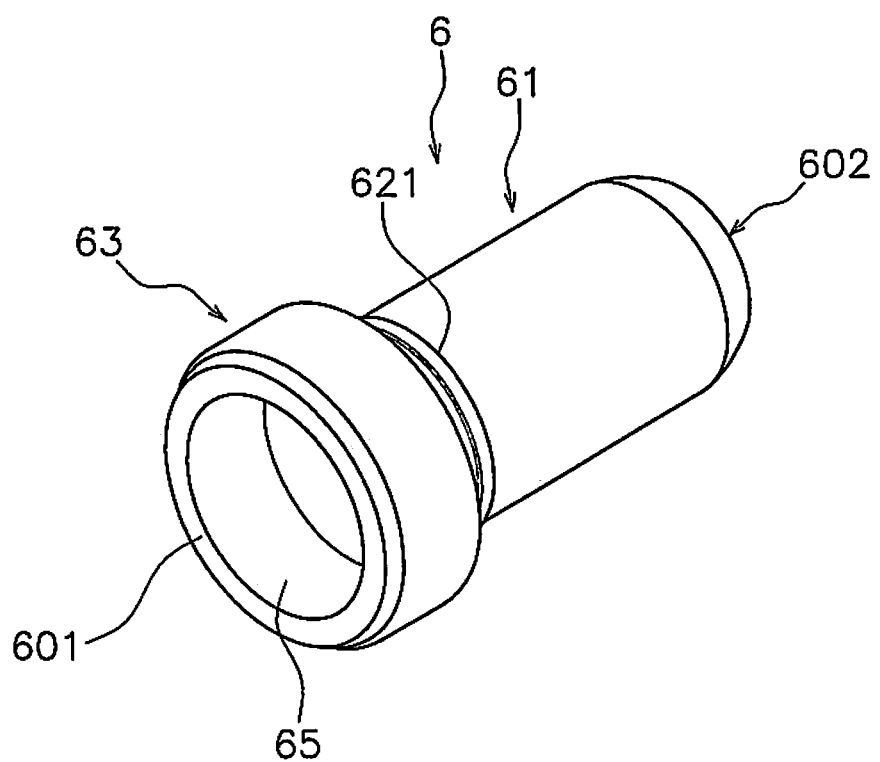
FIG. 6 is a perspective view of the electrode.
Figure 7:
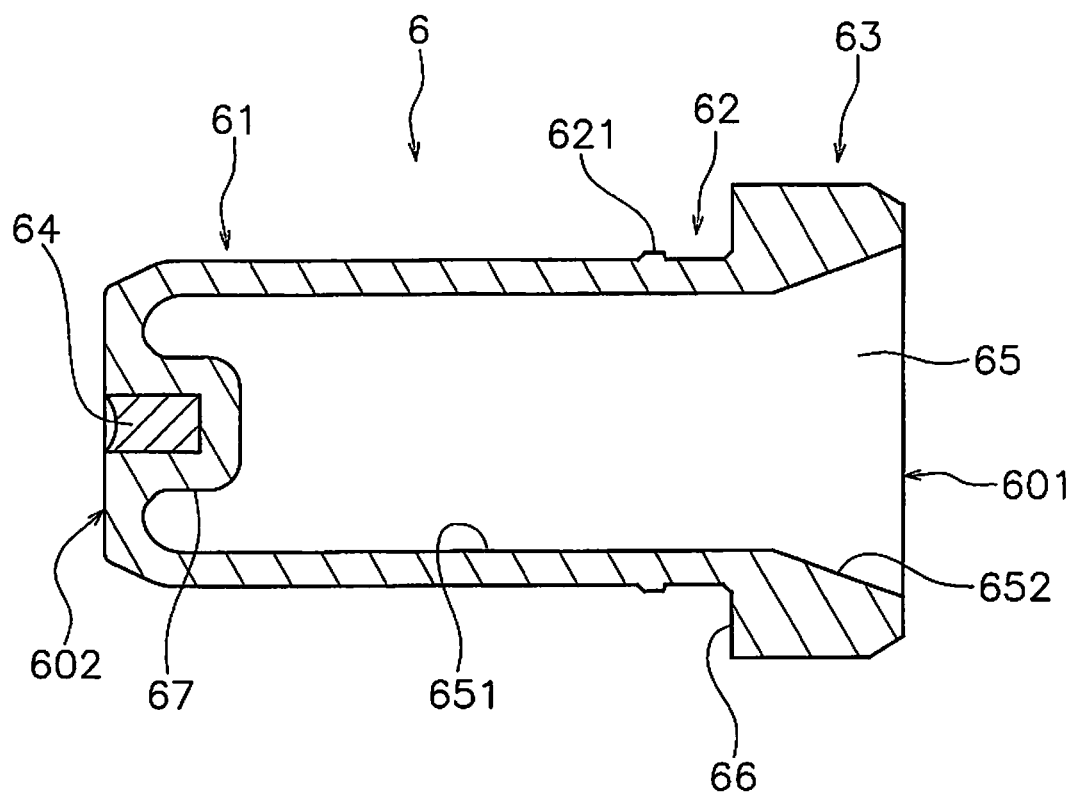
FIG. 7 is a cross-sectional view of the electrode.

FIGS. 5 and 6 are perspective views of the electrode 6. FIG. 7 is a cross-sectional view of the electrode 6. As illustrated in FIGS. 5 and 6, the electrode 6 has a cylindrical shape. The electrode 6 is formed with an electrically conductive body. The electrode 6 includes an electrode body portion 61, a coupling portion 62, and a flange portion 63.

The electrode body portion 61 includes the tip end of the electrode 6. A heat resistant insert 64 is embedded in the middle of a tip end surface 602 of the electrode 6. The heat resistant insert 64 is made, for example, from hafnium in the present embodiment. However, an electrode material other than hafnium may be used as the heat resistant insert 64. As illustrated in FIG. 4, a portion of the electrode body portion 61 is disposed inside a hole of the insulation guide 7. The tip end portion of the electrode body portion 61 protrudes from the insulation guide 7. The tip end portion of the electrode body portion 61 has a tapered shape.

The coupling portion 62 is positioned on the base end side of the electrode body portion 61. The coupling portion 62 is positioned between the electrode body portion 61 and the flange portion 63 in the axial direction of the electrode 6. The coupling portion 62 is coupled to the insulation guide 7 by press-fitting. Therefore, the coupling portion 62 is coupled to the insulation guide 7 so as to seal a fluid without an O-ring.

The external circumferential surface of the coupling portion 62 has an uneven shape that engages with the internal circumferential surface of the insulation guide 7. Specifically, the coupling portion 62 includes a protruding portion 621. The protruding portion 621 protrudes from the external circumferential surface of the coupling portion 62. The protruding portion 621 extends in the circumferential direction of the coupling portion 62.

The flange portion 63 is positioned on the base end side of the coupling portion 62. The flange portion 63 includes the base end of the electrode 6. The flange portion 63 has an outer diameter greater than that of the coupling portion 62. The flange portion 63 is longer than the coupling portion 62 in the axial direction of the electrode 6. The external circumferential surface of the flange portion 63 extends in the axial direction of the electrode 6. The external circumferential surface of the flange portion 63 has a flat shape without unevenness as seen in the cross sectional view. Chamfering is performed on the base end portion of the external circumferential surface of the flange portion 63. A step portion 66 is provided between the flange portion 63 and the coupling portion 62. The step portion 66 is a surface perpendicular to the axial direction of the electrode 6.

The electrode 6 includes an internal channel 65. The center pipe 20 illustrated in FIG. 1 is inserted into the internal channel 65. The inlet of the internal channel 65 is provided on a base end surface 601 of the electrode 6. The internal channel 65 extends in the axial direction of the electrode 6 from the base end surface 601 toward the tip end of the electrode 6. A protruding portion 67 is provided in the internal channel 65 at the tip end of the electrode 6. The abovementioned heat resistant insert 64 is disposed inside the protruding portion 67. A portion of the protruding portion 67 is disposed inside a cooling water channel of the center pipe 20 while the replacement part unit 2a is attached to the torch body 3.

The internal circumferential surface of the internal channel 65 includes a linear portion 651 and a tapered portion 652. The linear portion 651 extends parallel to the axial direction of the electrode 6. The tapered portion 652 expands in the radial direction toward the inlet of the internal channel 65.

Figure 8:
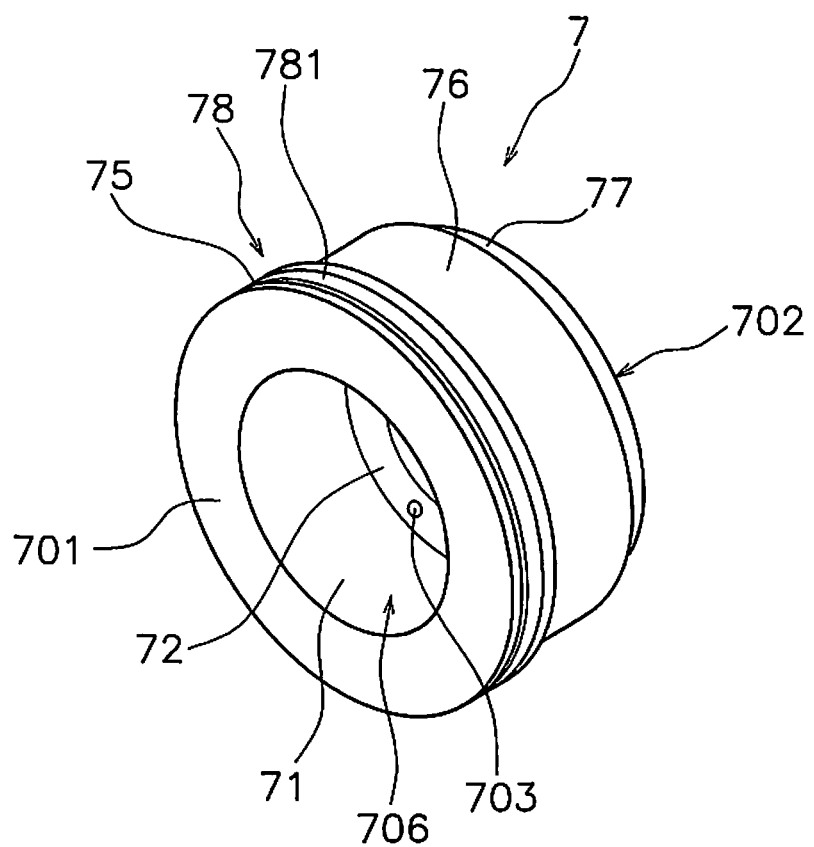
FIG. 8 is a perspective view of an insulation guide.
Figure 9:
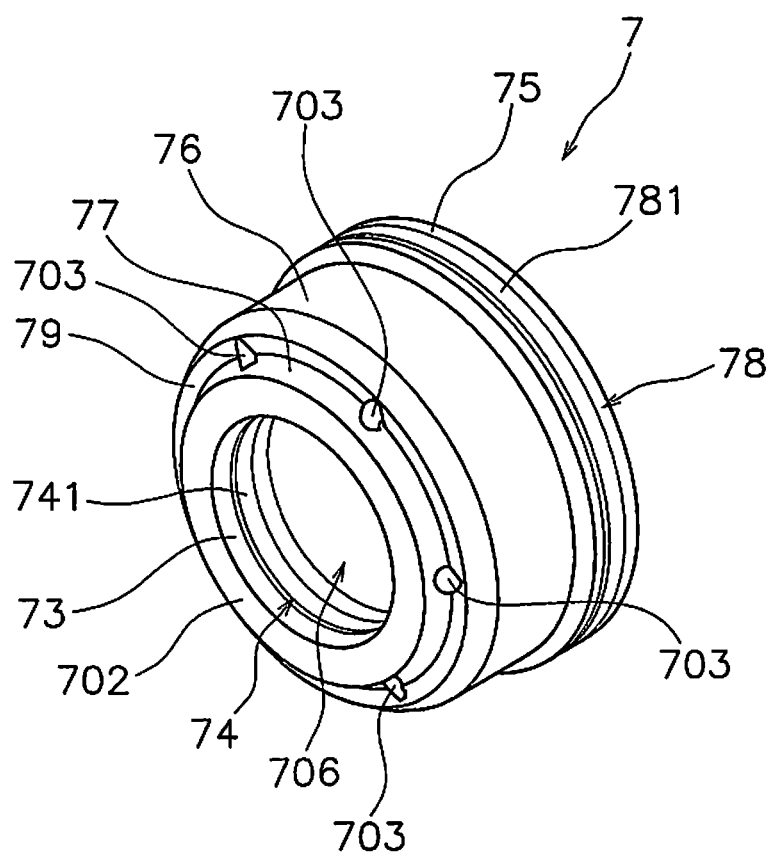
FIG. 9 is a perspective view of the insulation guide.
Figure 10:
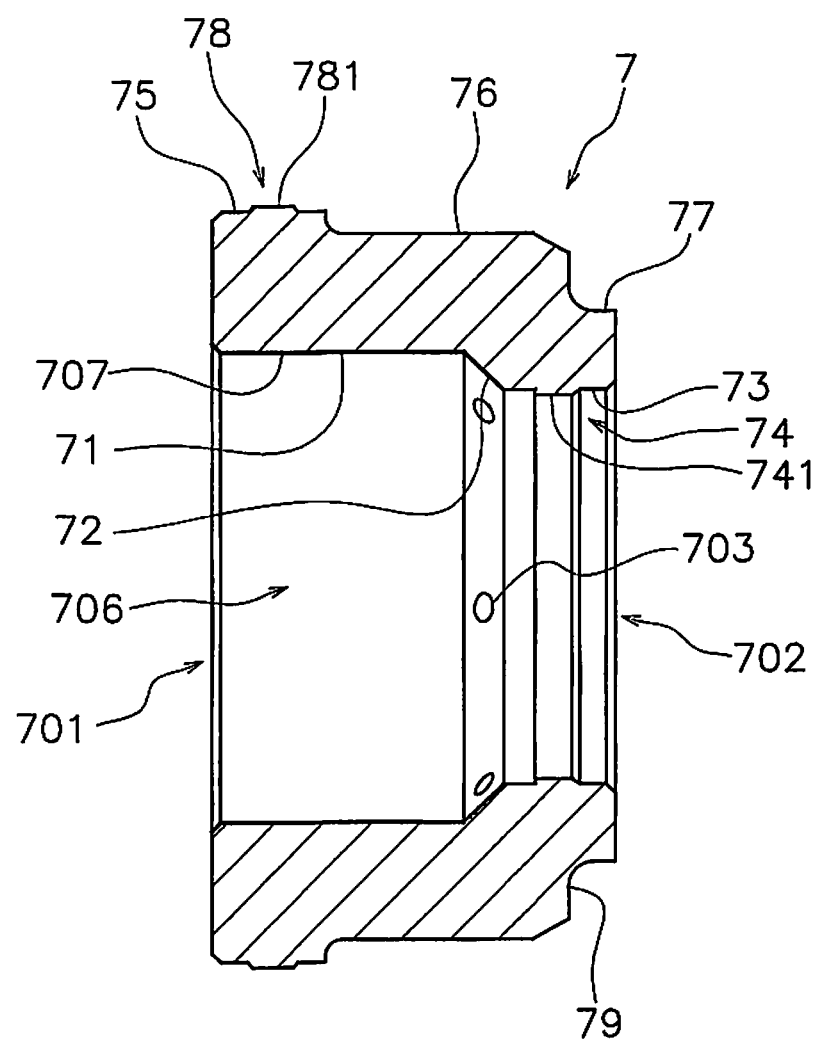
FIG. 10 is a cross-sectional view of the insulation guide.

The insulation guide 7 will be discussed next. FIGS. 8 and 9 are perspective views of the insulation guide 7. FIG. 10 is a cross-sectional view of the insulation guide 7. The insulation guide 7 electrically insulates the electrode 6 and the nozzle 8 and couples the electrode 6 and the nozzle 8. The insulation guide 7 positions the electrode 6 and the nozzle 8 in the axial direction and the radial direction with regard to each other.

The insulation guide 7 has a tubular shape. The insulation guide 7 is formed with an insulating body. The insulation guide 7 includes a hole 706 into which the electrode 6 is inserted. The hole 706 of the insulation guide 7 penetrates the insulation guide 7 in the axial direction of the insulation guide 7.

The insulation guide 7 is formed with a material having a modulus of elasticity that is less than the modulus of elasticity of a ceramic. The insulation guide 7 is made from a resin such as an engineered plastic in the present embodiment. Specifically, the insulation guide 7 is made from a resin that has a continuous use temperature of 100° C. or higher. Moreover, the insulation guide 7 is preferably made from a resin that has a continuous use temperature of 300° C. or less. However, the insulation guide 7 may be made from a material other than a resin.

As illustrated in FIG. 10, the internal circumferential surface of the insulation guide 7 includes a first internal circumferential surface 71, an inside step portion 72, and a second internal circumferential surface 73. The first internal circumferential surface 71 extends in the axial direction of the insulation guide 7 and reaches a tip end surface 701 of the insulation guide 7. The first internal circumferential surface 71 has an inner diameter that is greater than that of the second internal circumferential surface 73. The first internal circumferential surface 71 faces the external circumferential surface of the electrode body portion 61 with a gap therebetween. As explained below, the first internal circumferential surface 71 configures a gas channel with the external circumferential surface of the electrode body portion 61. The inner diameter of the first internal circumferential surface 71 is roughly the same as the inner diameter of the nozzle 8. Therefore, the inner diameter of the gas channel between the first internal circumferential surface 71 and the electrode 6 is roughly the same as the inner diameter of the nozzle 8.

The inside step portion 72 is positioned on the base end side of the first internal circumferential surface 71. The inside step portion 72 is positioned between the first internal circumferential surface 71 and the second internal circumferential surface 73 in the axial direction of the insulation guide 7. The inside step portion 72 is inclined with respect to the axial direction of the insulation guide 7 so as to become larger in the radial direction toward the tip end side.

A heat resistant coating 707 is formed on the first internal circumferential surface 71 and the inside step portion 72. The heat resistant coating 707 is formed from a ceramic-based material. The heat resistant coating 707 is formed from boron nitride for example. However, the heat resistant coating 707 may be formed from a ceramic-based material other than boron nitride. Alternatively, the heat resistant coating 707 may be formed from a heat resistant material other than a ceramic-based material. Alternatively, the heat resistant coating 707 may be omitted.

The second internal circumferential surface 73 is positioned on the base end side of the inside step portion 72. The second internal circumferential surface 73 extends in the axial direction of the insulation guide 7 and reaches a base end surface 702 of the insulation guide 7. The second internal circumferential surface 73 includes a first coupling portion 74. The first coupling portion 74 is coupled to the coupling portion 62 of the electrode 6 by press-fitting. Therefore, the first coupling portion 74 of the insulation guide 7 is coupled to the electrode 6 so as to seal a fluid without an O-ring.

As illustrated in FIG. 4, the electrode 6 and the insulation guide 7 are positioned in the radial direction with respect to each other due to the first coupling portion 74 of the insulation guide 7 being coupled with the coupling portion 62 of the electrode 6. Moreover, the base end surface 702 of the insulation guide 7 comes into contact with the step portion 66 of the flange portion 63 of the electrode 6 whereby the electrode 6 and the insulation guide 7 are positioned in the axial direction with respect to each other.

The first coupling portion 74 has an uneven shape that engages with the external circumferential surface of the electrode 6. Specifically, the first coupling portion 74 includes a protruding portion 741. The protruding portion 741 protrudes from the second internal circumferential surface 73. The protruding portion 741 extends in the circumferential direction of the second internal circumferential surface 73. The protruding portion 741 of the first coupling portion 74 of the insulation guide 7 engages with the protruding portion 621 of the coupling portion 62 of the electrode 6. As a result, the insulation guide 7 is securely locked onto the electrode 6.

The external circumferential surface of the insulation guide 7 includes a first external circumferential surface 75, a second external circumferential surface 76, and a third external circumferential surface 77. The first external circumferential surface 75 extends in the axial direction of the insulation guide 7 and reaches the tip end surface 701 of the insulation guide 7. The first external circumferential surface 75 is disposed inside a first hole 811 of the nozzle 8. The first external circumferential surface 75 includes a second coupling portion 78. The second coupling portion 78 is coupled to the internal circumferential surface of the nozzle 8 by press-fitting. Therefore, the second coupling portion 78 of the insulation guide 7 is coupled to the nozzle 8 so as to seal a fluid without an O-ring.

The second coupling portion 78 of the insulation guide 7 has an uneven shape that engages with the internal circumferential surface of the nozzle 8. Specifically, the second coupling portion 78 of the insulation guide 7 includes a protruding portion 781. The protruding portion 781 protrudes from the first external circumferential surface 75. The protruding portion 781 extends in the circumferential direction of the first external circumferential surface 75.

The second external circumferential surface 76 is positioned on the base end side of the first external circumferential surface 75. The second external circumferential surface 76 extends in the axial direction of the insulation guide 7. The second external circumferential surface 76 has a flat shape without unevenness as seen in the cross sectional view. The second external circumferential surface 76 is disposed between the first external circumferential surface 75 and the third external circumferential surface 77 in the axial direction of the insulation guide 7. The second external circumferential surface 76 is disposed outside of the nozzle 8. The second external circumferential surface 76 has an outer diameter that is smaller than that of the first external circumferential surface 75. In other words, the outer diameter of the first external circumferential surface 75 is greater than the outer diameter of the second external circumferential surface 76. The first external circumferential surface 75 is shorter than the second external circumferential surface 76 in the axial direction of the insulation guide 7.

The third external circumferential surface 77 is positioned on the base end side of the second external circumferential surface 76. The third external circumferential surface 77 has an outer diameter that is smaller than that of the second external circumferential surface 76. The third external circumferential surface 77 extends in the axial direction of the insulation guide 7 and reaches the base end surface 702 of the insulation guide 7. The second external circumferential surface 76 is longer than the third external circumferential surface 77 in the axial direction of the insulation guide 7. In other words, the third external circumferential surface 77 is shorter than the second external circumferential surface 76 in the axial direction of the insulation guide 7. The third external circumferential surface 77 is shorter than the first external circumferential surface 75 in the axial direction of the insulation guide 7.

The external circumferential surface of the insulation guide 7 includes an outside step portion 79. The outside step portion 79 is disposed between the second external circumferential surface 76 and the third external circumferential surface 77. The outside step portion 79 is a surface perpendicular to the axial direction of the insulation guide 7.

Figure 11:
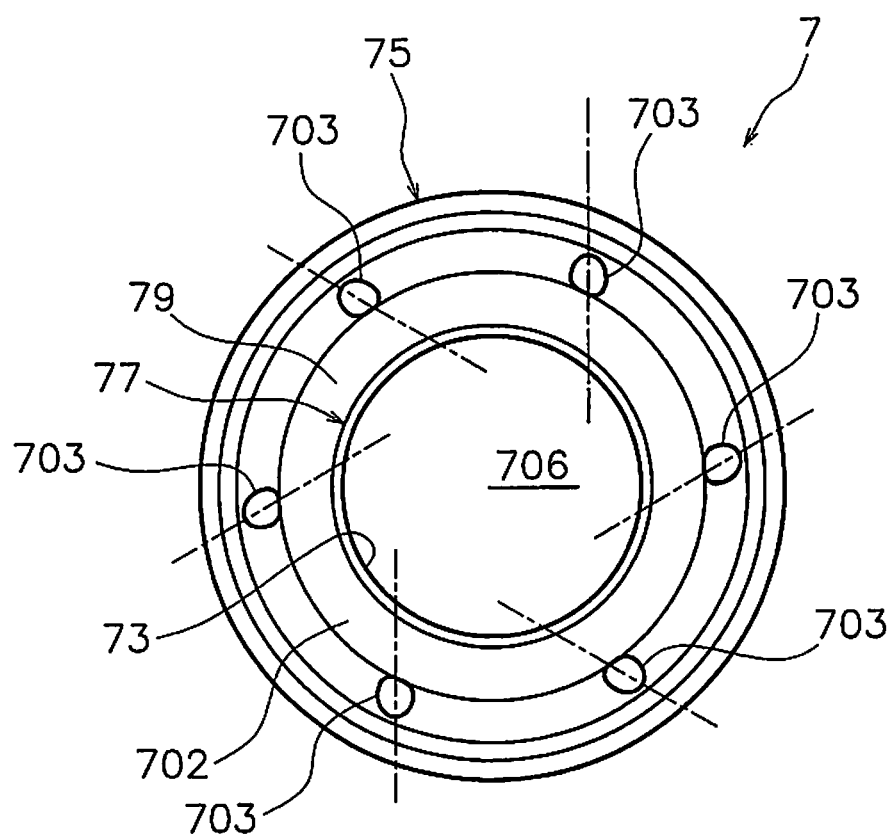
FIG. 11 is a view of the insulation guide as seen from the base end side.

FIG. 11 is a view of the insulation guide 7 as seen from the base end side. As illustrated in FIGS. 9 and 11, the insulation guide 7 includes a plurality of communication channels 703. The insulation guide 7 includes six communication channels 703 in the present embodiment. The number of communication channels 703 is not limited to six and may be less than six or greater than six.

Figure 12:
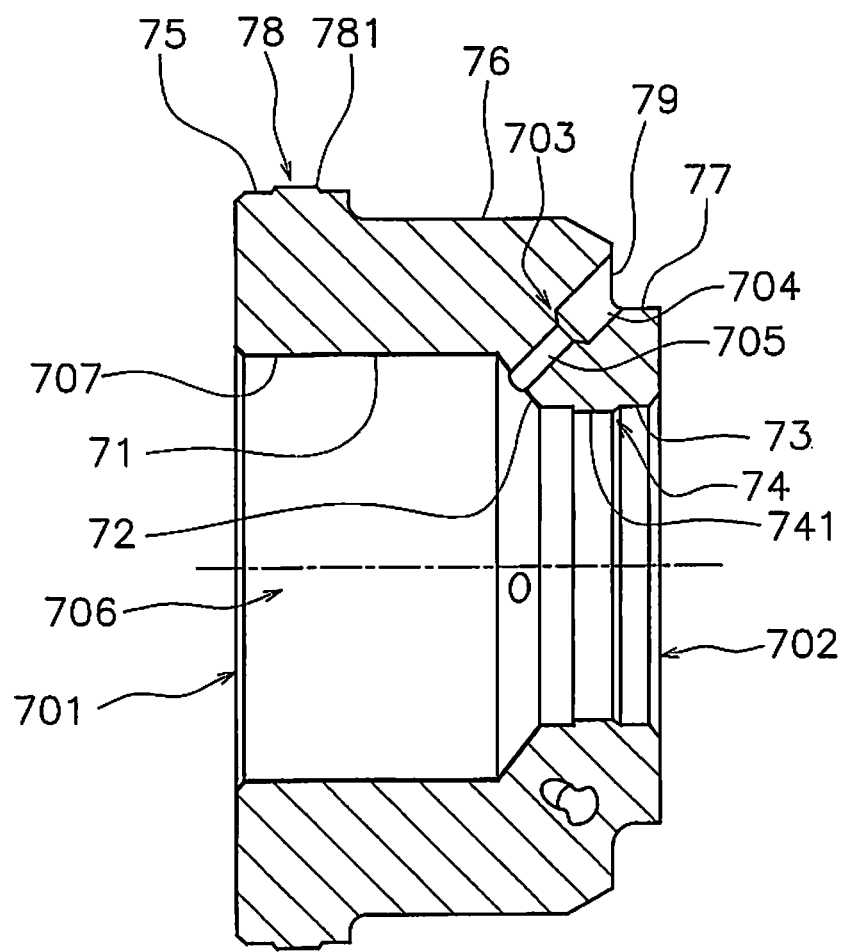
FIG. 12 is a cross-sectional view of the insulation guide including the axis of a communication channel.

FIG. 12 is a cross-sectional view of the insulation guide 7 including the axis of one of the communication channels 703. As illustrated in FIG. 12, the communication channels 703 allow communication between the outside of the insulation guide 7 and the inside of the hole 706 of the insulation guide 7. In other words, the communication channels 703 allow communication between the outside of the insulation guide 7 and the gas channel inside the insulation guide 7. The communication channels 703 extend in a direction inclined with respect to the axial direction. The communication channels 703 are inclined so as to approach the axis of the insulation guide 7 toward the tip end of the insulation guide 7. The inclination angle of the communication channels 703 with respect to the axial direction of the insulation guide 7 is preferably at least 30 degrees and no greater than 60 degrees. For example, the inclination angle of the communication channels 703 with respect to the axial direction of the insulation guide 7 is 45 degrees.

One end of each of the communication channels 703 is connected to the inside step portion 72. The other end of each of the communication channels 703 is connected to the outside step portion 79. Each communication channel 703 is connected to the external circumferential surface of the insulation guide 7 at a position nearer the base end side than the center in the axial direction of the insulation guide 7. Each communication channel 703 includes a first communication channel 704 and a second communication channel 705.

The first communication channel 704 has a larger flow path cross-section than the second communication channel 705. The first communication channel 704 is connected to the outside step portion 79. The first communication channel 704 communicates with the outside of the insulation guide 7. The second communication channel 705 is connected to the inside step portion 72. The second communication channel 705 communicates with the gas channel inside the insulation guide 7. While only one communication channel 703 is illustrated in FIG. 12, the other communication channels 703 have the same structure as the communication channel 703 in FIG. 12.

As illustrated in FIG. 11, the plurality of communication channels 703 are inclined with respect to the circumferential direction and the radial direction. All of the communication channels 703 are inclined in the same direction with respect to the circumferential direction. All of the communication channels 703 are inclined in the same direction with respect to the radial direction. As a result, gas emitted from the communication channels 703 produces a swirling flow. The plurality of communication channels 703 are disposed at equal intervals in the circumferential direction of the insulation guide 7. The axis of each communication channel 703 is separated by a predetermined distance from a straight line parallel to the axis of each communication channel 703 and passing through the center of the insulation guide 7.

Figure 13:
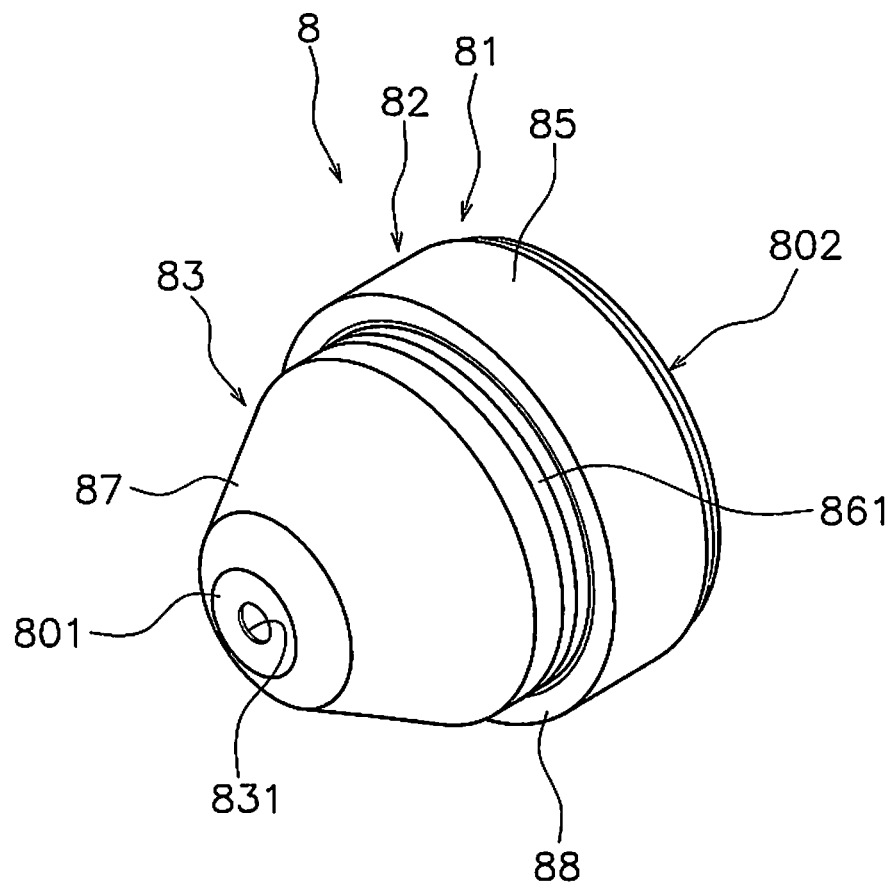
FIG. 13 is a perspective view of a nozzle.
Figure 14:
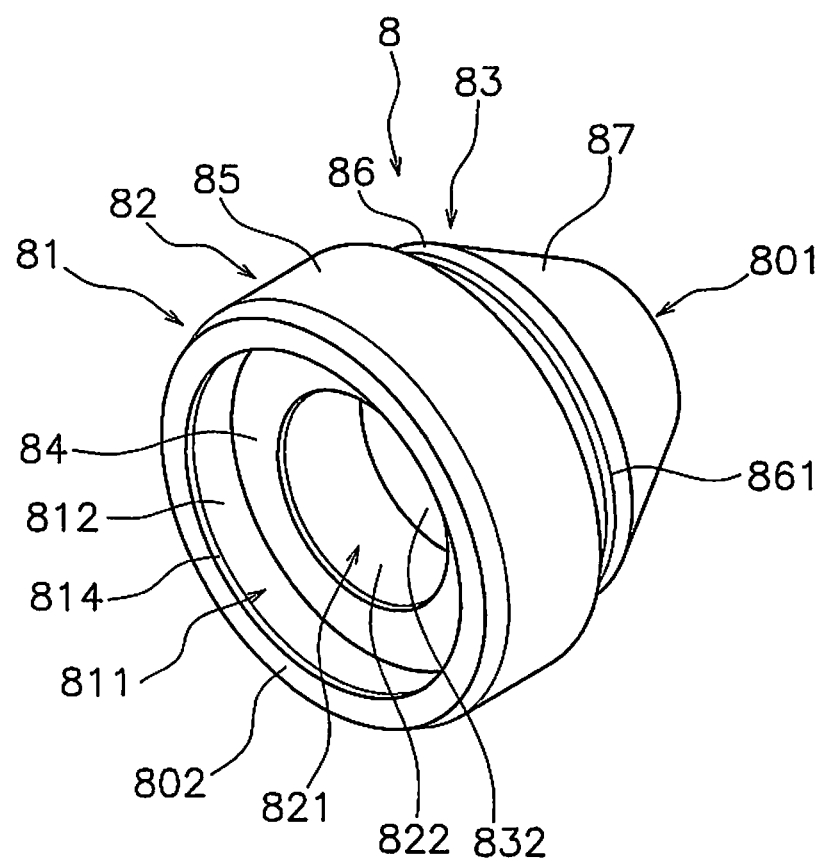
FIG. 14 is a perspective view of the nozzle.
Figure 15:
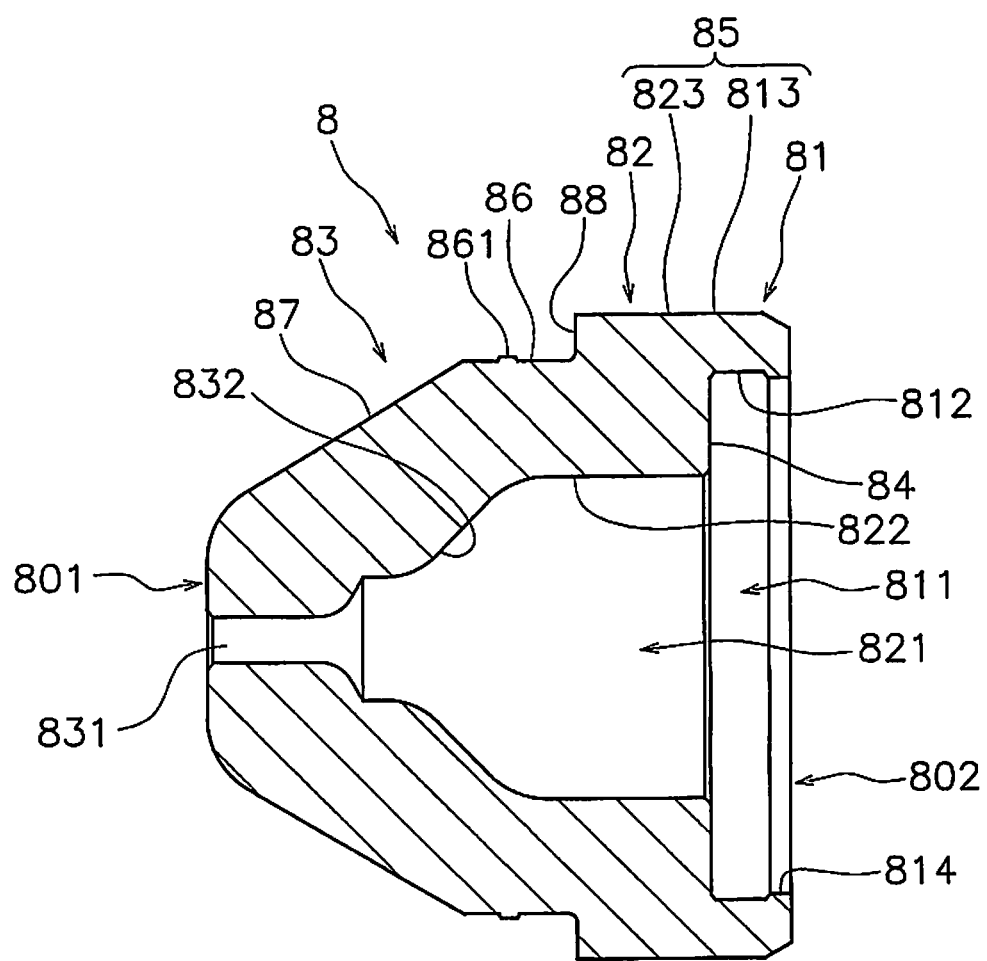
FIG. 15 is a cross-sectional view of the nozzle.

The nozzle 8 will be discussed next. FIGS. 13 and 14 are perspective views of the nozzle 8. FIG. 15 is a cross-sectional view of the nozzle 8. The nozzle 8 has a cylindrical shape in which the tip end portion is tapered. The nozzle 8 includes a hole 811 into which the insulation guide 7 is inserted and the nozzle 8 is coupled to the insulation guide 7 by press-fitting. Specifically, the nozzle 8 includes a first nozzle portion 81, a second nozzle portion 82, and a third nozzle portion 83.

The first nozzle portion 81 includes the base end of the nozzle 8. The first nozzle portion 81 includes the first hole 811. The second nozzle portion 82 is positioned on the tip end side of the first nozzle portion 81. The second nozzle portion 82 is positioned between the first nozzle portion 81 and the third nozzle portion 83 in the axial direction of the nozzle 8. The second nozzle portion 82 is longer than the first nozzle portion 81 in the axial direction of the nozzle 8.

The second nozzle portion 82 includes a second hole 821 that communicates with the first hole 811. The second hole 821 has an internal diameter that is smaller than that of the first hole 811. Therefore, an inside step portion 84 is provided between an internal circumferential surface 812 of the first nozzle portion 81 and an internal circumferential surface 822 of the second nozzle portion 82. The inside step portion 84 is a surface perpendicular to the axial direction of the nozzle 8.

The outer diameter of the second nozzle portion 82 is the same as the outer diameter of the first nozzle portion 81. Therefore, an external circumferential surface 823 of the second nozzle portion 82 is flush with an external circumferential surface 813 of the first nozzle portion 81. Chamfering is performed on the base end of the external circumferential surface 813 of the first nozzle portion 81. The second nozzle portion 82 has a thickness in the radial direction that is larger than that of the first nozzle portion 81.

The third nozzle portion 83 includes the tip end of the nozzle 8. The third nozzle portion 83 is positioned on the tip end side of the second nozzle portion 82. The third nozzle portion 83 includes a jetting hole 831. The jetting hole 831 has an internal diameter that is smaller than that of the second hole 821. The jetting hole 831 extends in the axial direction of the nozzle 8 and reaches a tip end surface 801 of the nozzle 8. The abovementioned first hole 811 is shorter than the jetting hole 831 in the axial direction of the nozzle 8.

The jetting hole 831 communicates with the second hole 821 via a tapered hole 832. The tapered hole 832 is positioned between the jetting hole 831 and the second hole 821 in the axial direction of the nozzle 8 and is connected to the jetting hole 831 and the second hole 821. The tapered hole 832 decreases in size in the radial direction toward the tip end of the nozzle 8.

The external circumferential surface of the nozzle 8 includes a first external circumferential surface 85, a second external circumferential surface 86, and a third external circumferential surface 87. The first external circumferential surface 85 reaches a base end surface 802 of the nozzle 8. The first external circumferential surface 85 is configured by the external circumferential surface 813 of the first nozzle portion 81 and the external circumferential surface 823 of the second nozzle portion 82. The first external circumferential surface 85 has a linear shape that extends in the axial direction of the nozzle 8 as seen in the cross-sectional view. In other words, the first external circumferential surface 85 has a flat shape without unevenness as seen in the cross-sectional view.

The second external circumferential surface 86 is positioned on the tip end side of the first external circumferential surface 85. The second external circumferential surface 86 is positioned between the first external circumferential surface 85 and the third external circumferential surface 87 in the axial direction of the nozzle 8. The second external circumferential surface 86 has an outer diameter that is smaller than that of the first external circumferential surface 85. Therefore, an outside step portion 88 is provided between the first external circumferential surface 85 and the second external circumferential surface 86. The outside step portion 88 is a surface perpendicular to the axial direction of the nozzle 8.

The third external circumferential surface 87 is positioned on the tip end side of the second external circumferential surface 86. The third external circumferential surface 87 reaches the tip end surface 801 of the nozzle 8. The third external circumferential surface 87 is inclined so as to become smaller in the radial direction toward the tip end.

The insulation guide 7 is inserted into the first hole 811 of the first nozzle portion 81. The electrode 6 is inserted into the second hole 821 of the second nozzle portion 82. As illustrated in FIG. 4, the internal circumferential surface 822 of the second nozzle portion 82 faces the electrode body portion 61 with a gap therebetween. The tip end of the electrode 6 faces the tapered hole 832 of the third nozzle portion 83.

The first nozzle portion 81 is coupled to the insulation guide 7. Specifically, the second coupling portion 78 of the insulation guide 7 is inserted into the first hole 811 and the first nozzle portion 81 is coupled to the second coupling portion 78 of the insulation guide 7 by press-fitting. As a result, the internal circumferential surface 812 of the first nozzle portion 81 is coupled to the insulation guide 7 so as to seal a fluid without an O-ring.

The internal circumferential surface 812 of the first nozzle portion 81 is coupled to the second coupling portion 78 of the insulation guide 7 whereby the nozzle 8 and the insulation guide 7 are positioned in the radial direction with regard to each other. Further, the tip end surface 701 of the insulation guide 7 comes into contact with the inside step portion 84 of the nozzle 8 whereby the nozzle 8 and the insulation guide 7 are positioned in the axial direction with regard to each other.

The internal circumferential surface 812 of the first nozzle portion 81 has an uneven shape that engages with the external circumferential surface of the insulation guide 7. Specifically, the internal circumferential surface 812 of the first nozzle portion 81 includes a protruding portion 814. The protruding portion 814 of the first nozzle portion 81 engages with the protruding portion 781 of the second coupling portion 78 of the insulation guide 7. As a result, the nozzle 8 is locked onto the insulation guide 7.

The second external circumferential surface 86 has an uneven shape that engages onto the internal circumferential surface of the insulation ring 9. Specifically, the second external circumferential surface 86 includes a protruding portion 861.

Figure 16:
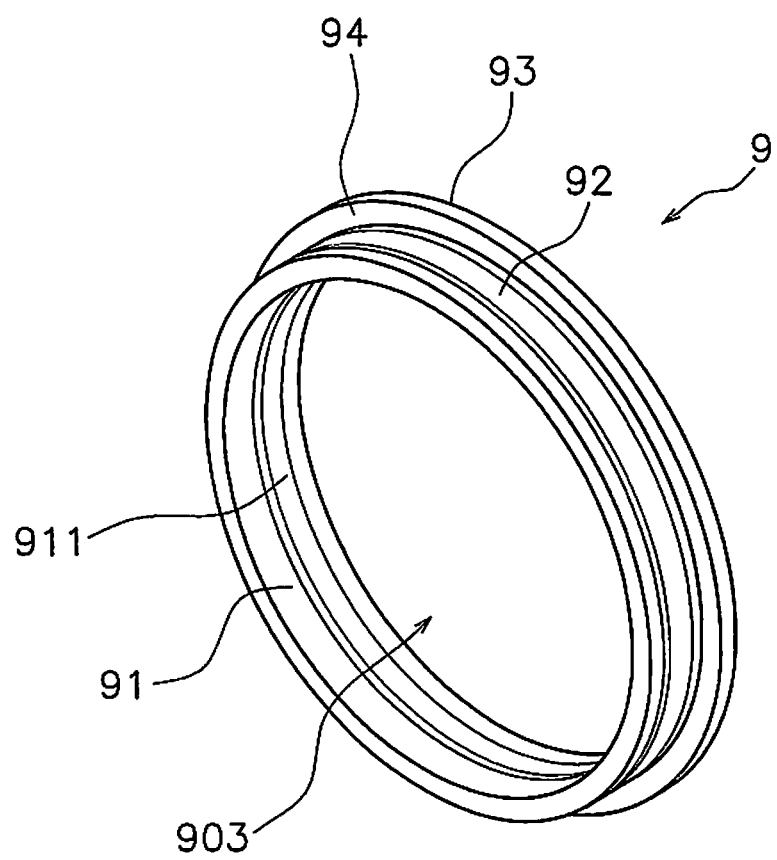
FIG. 16 is a perspective view of an insulation ring.
Figure 17:
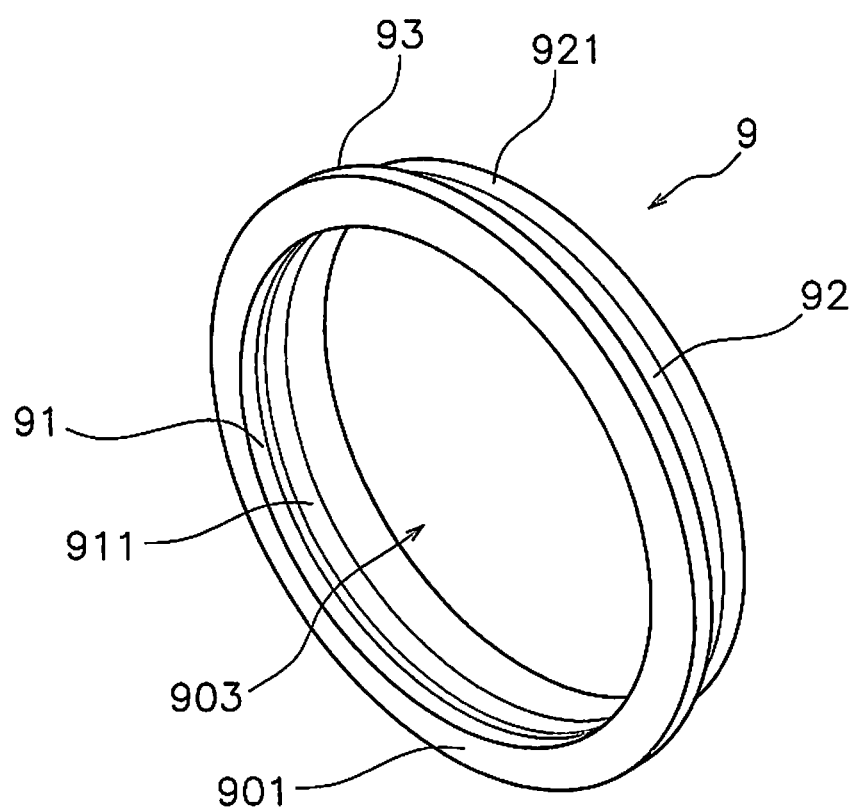
FIG. 17 is a perspective view of the insulation ring.
Figure 18:
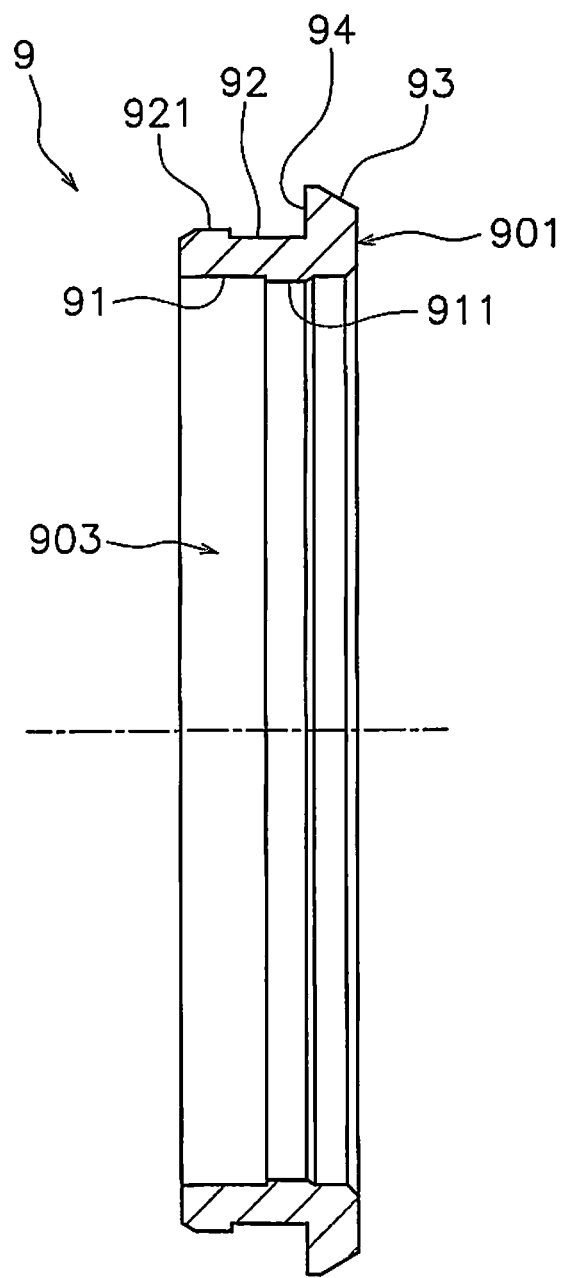
FIG. 18 is a cross-sectional view of the insulation ring.

FIGS. 16 and 17 are perspective views of the insulation ring 9. FIG. 18 is a cross-sectional view of the insulation ring 9. As illustrated in FIGS. 16 to 18, the insulation ring 9 includes a hole 903 into which the nozzle 8 is inserted. An internal circumferential surface 91 of the insulation ring 9 includes a protruding portion 911. An external circumferential surface 92 of the insulation ring 9 includes a protruding portion 921.

The insulation ring 9 includes a flange portion 93. The flange portion 93 protrudes from the external circumferential surface 92 of the insulation ring 9. Therefore, a step portion 94 is provided between the external circumferential surface 92 and the flange portion 93 of the insulation ring 9. The step portion 94 is a surface perpendicular to the axial direction of the insulation ring 9.

As illustrated in FIG. 4, the insulation ring 9 is coupled to the nozzle 8 by press-fitting. Specifically, the internal circumferential surface 91 of the insulation ring 9 is coupled to the second external circumferential surface 86 of the nozzle 8 by press-fitting. The internal circumferential surface 91 of the insulation ring 9 is coupled to the second external circumferential surface 86 of the nozzle 8 whereby the insulation ring 9 and the nozzle 8 are positioned in the radial direction with regard to each other.

Further, a base end surface 901 of the insulation ring 9 comes into contact with the outside end portion 88 of the nozzle 8, whereby the insulation ring 9 and the nozzle 8 are positioned in the axial direction with regard to each other. The protruding portion 911 of the internal circumferential surface 91 of the insulation ring 9 engages with the protruding portion 861 of the second external circumferential surface 86 of the nozzle 8. As a result, the insulation ring 9 is securely locked onto the nozzle 8.

Figure 19:
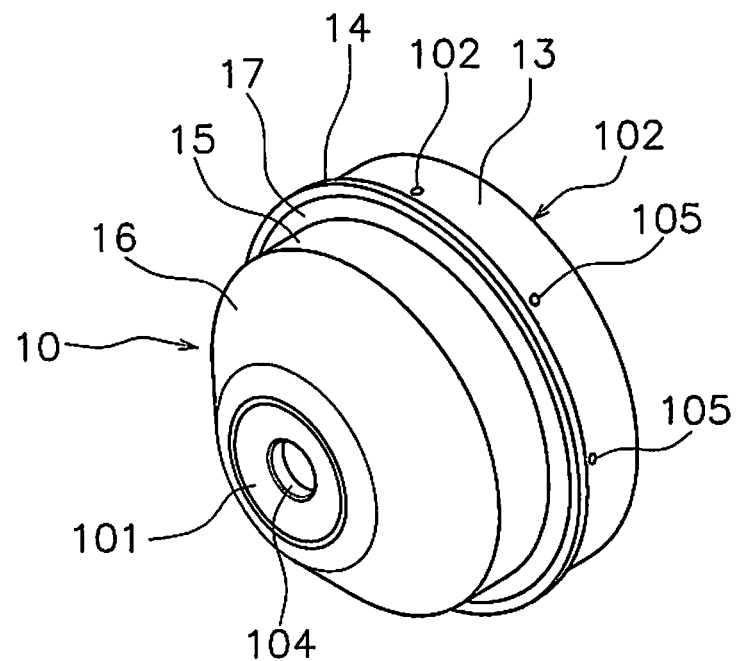
FIG. 19 is a perspective view of a shield cap.
Figure 20:
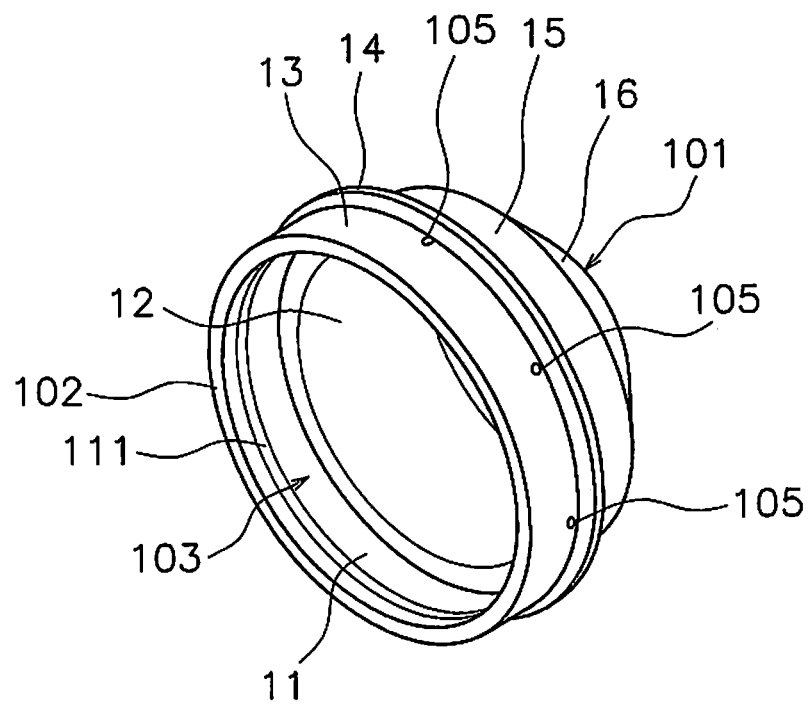
FIG. 20 is a perspective view of the shield cap.
Figure 21:
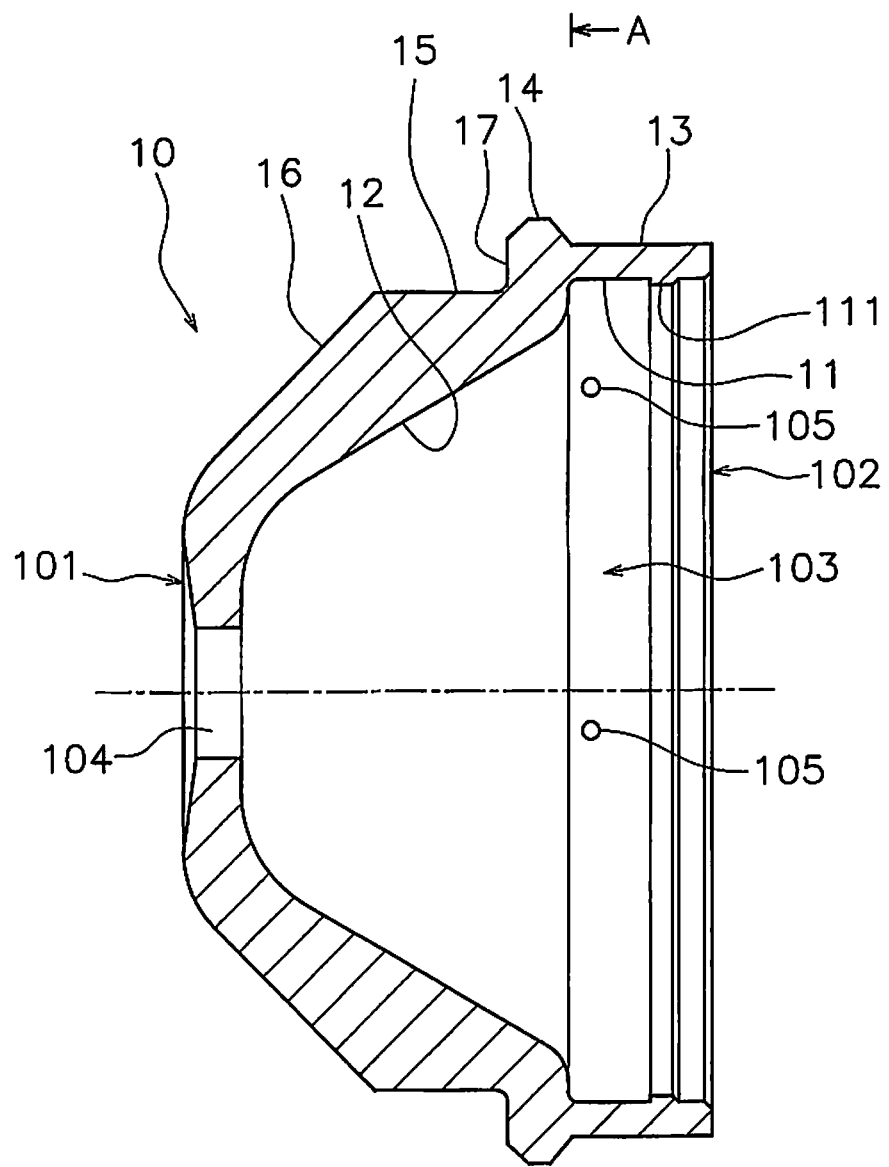
FIG. 21 is a cross-sectional view of the shield cap.

FIGS. 19 and 20 are perspective views of the shield cap 10. FIG. 21 is a cross-sectional view of the shield cap 10. As illustrated in FIGS. 19 to 21, the shield cap 10 includes a hole 103. The nozzle 8 is inserted into the hole 103 of the shield cap 10. The shield cap 10 includes a jetting hole 104. The jetting hole 104 communicates with the hole 103 and passes through a tip end surface 101 of the shield cap 10 in the axial direction.

The shield cap 10 includes a first internal circumferential surface 11 and a second internal circumferential surface 12. The first internal circumferential surface 11 extends in the axial direction of the shield cap 10 and reaches a base end surface 102 of the shield cap 10. The first internal circumferential surface 11 includes a protruding portion 111. The second internal circumferential surface 12 is positioned on the tip end side of the first internal circumferential surface 11. The second internal circumferential surface 12 is inclined so as to become smaller in the radial direction toward the tip end.

The shield cap 10 includes a first external circumferential surface 13, a flange portion 14, a second external circumferential surface 15, and a third external circumferential surface 16. The first external circumferential surface 13 extends in the axial direction of the shield cap 10 and reaches the base end surface 102 of the shield cap 10. The flange portion 14 is positioned on the tip end side of the first external circumferential surface 13. The flange portion 14 is positioned between the first external circumferential surface 13 and the second external circumferential surface 15 in the axial direction of the shield cap 10. The flange portion 14 protrudes from the first external circumferential surface 13. The flange portion 14 protrudes from the second external circumferential surface 15. An outside step portion 17 is provided between the flange portion 14 and the second external circumferential surface 15. The outside step portion 17 is a surface perpendicular to the axial direction of the shield cap 10. The outer diameter of the flange portion 14 is greater than the diameter of the opening 41 of the first retainer cap 4. The outer diameter of the flange portion 14 is greater than the diameter of the opening 51 of the second retainer cap 5.

The second external circumferential surface 15 is positioned on the tip end side of the flange portion 14. The second external circumferential surface 15 has an outer diameter that is smaller than that of the first external circumferential surface 13. The second external circumferential surface 15 extends in the axial direction of the shield cap 10. The third external circumferential surface 16 is positioned on the tip end side of the second external circumferential surface 15. The third external circumferential surface 16 reaches the tip end surface 101 of the shield cap 10. The third external circumferential surface 16 is inclined with respect to the axial direction of the shield cap 10 so as to become smaller in the radial direction toward the tip end.

Figure 22:
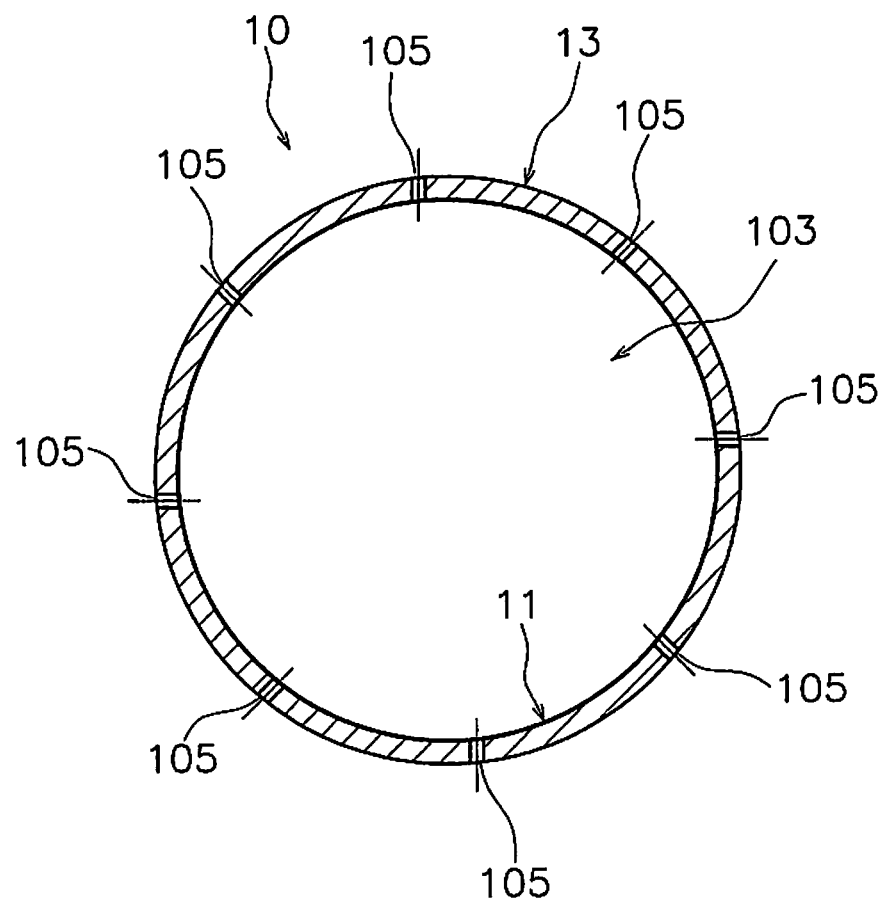
FIG. 22 is a cross-sectional view along line A-A in FIG. 21.

FIG. 22 is the cross-sectional view A-A in FIG. 21. As illustrated in FIGS. 21 and 22, the shield cap 10 includes a plurality of communication channels 105. The communication channels 105 allow communication between the outside of the shield cap 10 and the inside of the hole 103 of the shield cap 10. One end of each of the communication channels 105 reaches the first external circumferential surface 13. The other end of each of the communication channels 105 reaches the first internal circumferential surface 11.

The communication channels 105 are disposed in equal intervals in the circumferential direction of the shield cap 10. The axis of each communication channel 105 is separated by a predetermined distance from a straight line parallel to the axis of each communication channel 105 and passing through the center of the insulation guide 7 as seen in the axial direction of the shield cap 10. All of the communication channels 105 are inclined in the same direction with respect to the circumferential direction. All of the communication channels 105 are inclined in the same direction with respect to the radial direction. As a result, gas emitted from the communication channels 105 produces a swirling flow.

As illustrated in FIG. 4, the shield cap 10 is coupled to the insulation ring 9 by press-fitting. Specifically, the first internal circumferential surface 11 of the shield cap 10 is coupled to the external circumferential surface 92 of the insulation ring 9 by press-fitting. The protruding portion 111 of the first internal circumferential surface 11 of the shield cap 10 is engaged with the protruding portion 921 of the external circumferential surface 92 of the insulation ring 9. As a result, the shield cap 10 is securely locked onto the insulation ring 9.

The first internal circumferential surface 11 of the shield cap 10 is coupled to the external circumferential surface 92 of the insulation ring 9 whereby the shield cap 10 and the insulation ring 9 are positioned in the radial direction with respect to each other. As a result, the jetting hole 104 of the shield cap 10 and the jetting hole 831 of the nozzle 8 are disposed concentrically.

The base end surface 102 of the shield cap 10 comes into contact with the step portion 94 of the insulation ring 9 whereby the shield cap 10 and the insulation ring 9 are positioned in the axial direction with respect to each other. As a result, the shield cap 10 is disposed so as to be spaced away from the nozzle 8 with a gap therebetween. Specifically, the second internal circumferential surface 12 of the shield cap 10 is disposed so as to be spaced away from the third external circumferential surface 87 of the nozzle 8 with a gap therebetween. As a result, the belowmentioned gas channel is configured between the shield cap 10 and the nozzle 8. The communication channels 105 of the shield cap 10 are positioned closer to the tip end side than the tip end of the insulation ring 9. The communication channels 105 of the shield cap 10 communicate with the gas channel between the shield cap 10 and the nozzle 8.

Figure 23:
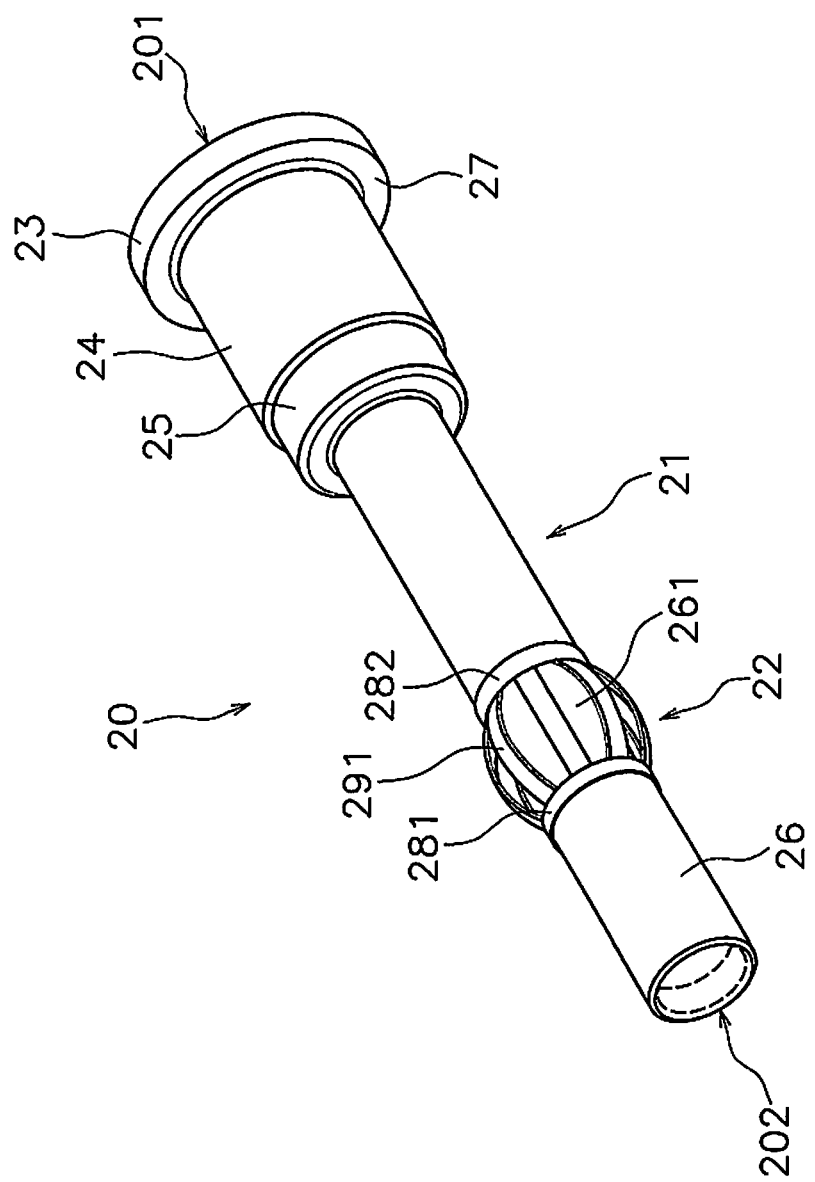
FIG. 23 is a perspective view of a center pipe.
Figure 24:
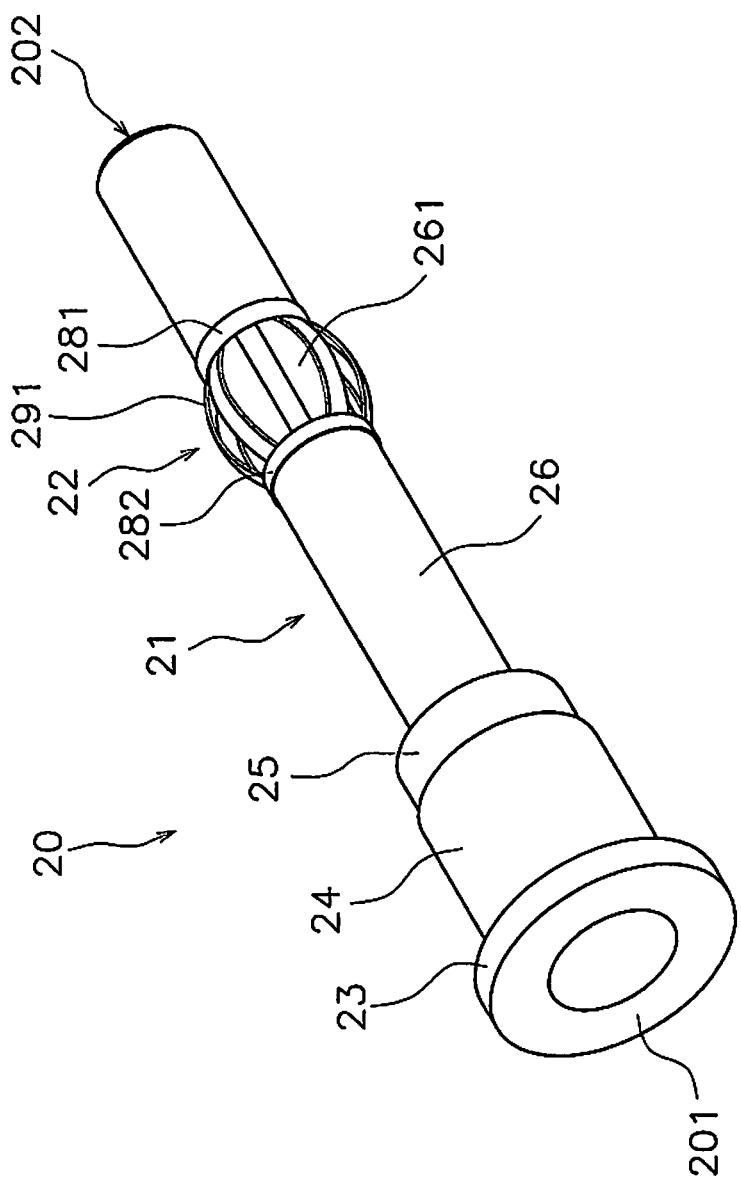
FIG. 24 is a perspective view of the center pipe.
Figure 25:
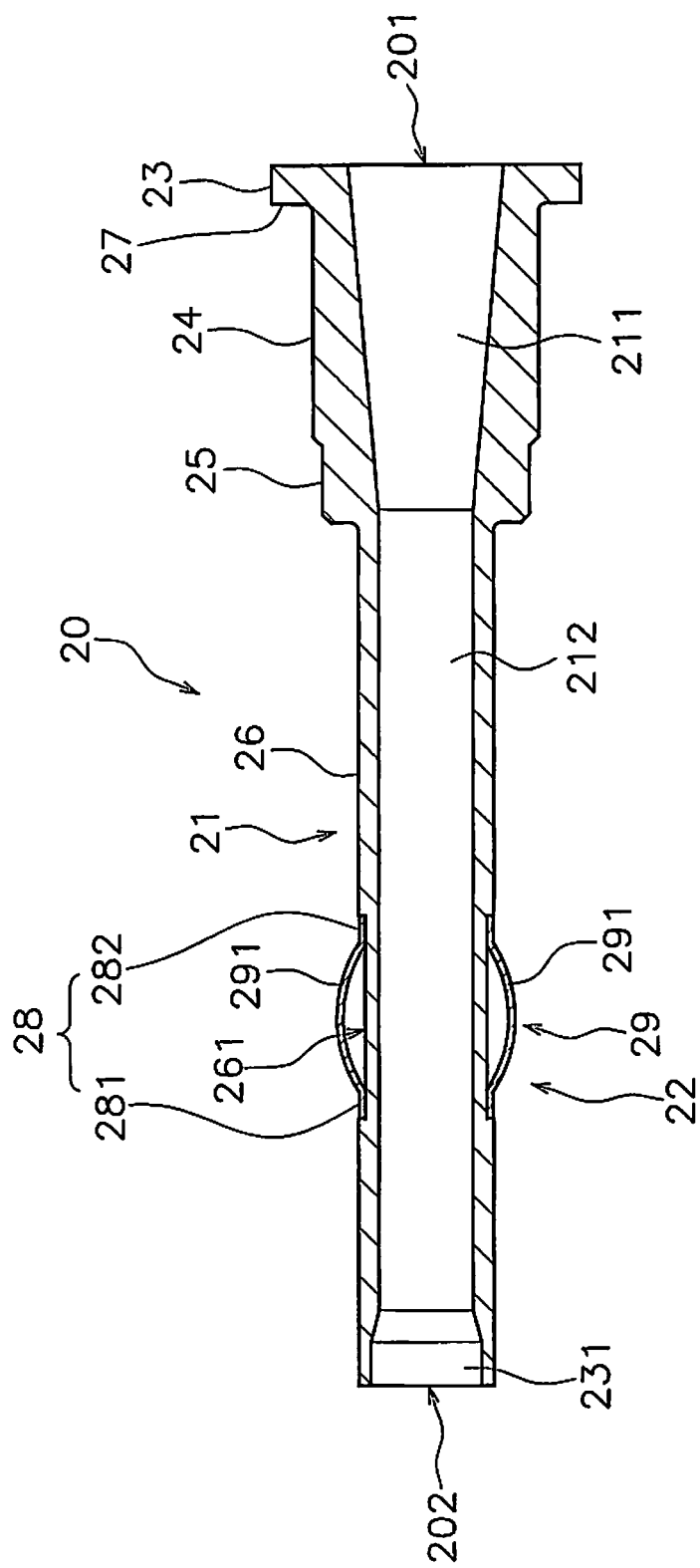
FIG. 25 is a cross-sectional view of the center pipe.
Figure 26:
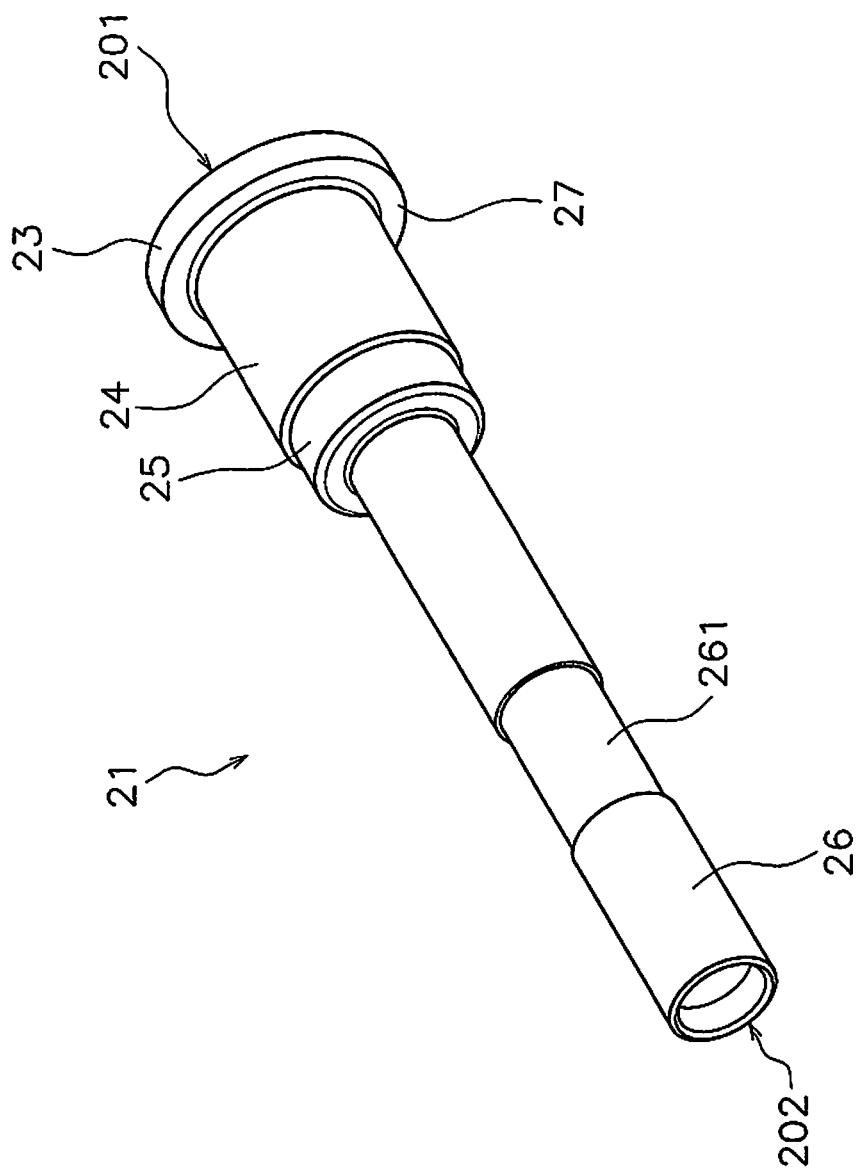
FIG. 26 is a perspective view of a pipe body.
Figure 27:
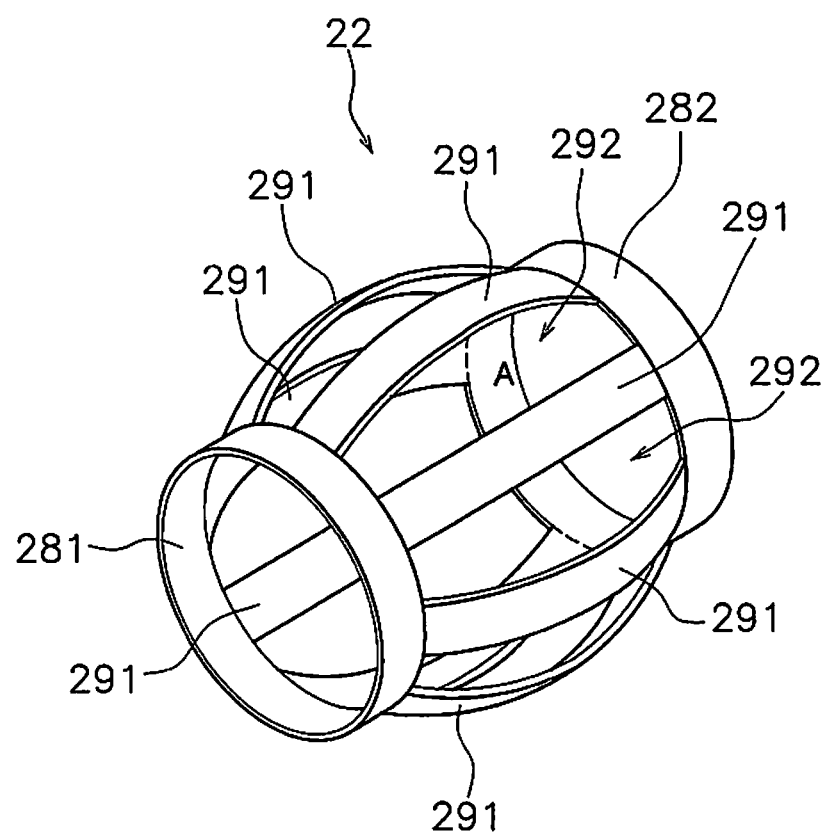
FIG. 27 is a perspective view of a contact piece.

The center pipe 20 will be discussed next. FIGS. 23 and 24 are perspective views of the center pipe 20. FIG. 25 is a cross-sectional view of the center pipe 20. The center pipe 20 is inserted into the internal channel 65 of the electrode 6 and supplies cooling water inside the electrode 6. The center pipe 20 is formed with an electrically conductive body. The center pipe 20 includes a pipe body 21 and a contact piece 22. FIG. 26 is a perspective view of the pipe body 21. FIG. 27 is a perspective view of the contact piece 22.

The pipe body 21 has a tube-like shape. The pipe body 21 is formed from an electrically conductive body. Specifically, the external circumferential surface of the pipe body 21 includes a flange portion 23, a first external circumferential surface 24, a second external circumferential surface 25, and a third external circumferential surface 26. The flange portion 23 includes the base end of the pipe body 21. The flange portion 23 protrudes from the first external circumferential surface 24. Therefore, a step portion 27 is provided between the flange portion 23 and the first external circumferential surface 24. The step portion 27 is a surface perpendicular to the axial direction of the pipe body 21.

The first external circumferential surface 24 is positioned on the tip end side of the flange portion 23. The first external circumferential surface 24 is positioned between the flange portion 23 and the second external circumferential surface 25 in the axial direction of the pipe body 21. The first external circumferential surface 24 extends in the axial direction of the pipe body 21.

The second external circumferential surface 25 is positioned on the tip end side of the first external circumferential surface 24. The second external circumferential surface 25 is positioned between the first external circumferential surface 24 and the third external circumferential surface 26 in the axial direction of the pipe body 21. The second external circumferential surface 25 extends in the axial direction of the pipe body 21. The second external circumferential surface 25 is shorter than the first external circumferential surface 24 in the axial direction of the pipe body 21. The second external circumferential surface 25 has an outer diameter that is smaller than that of the first external circumferential surface 24.

The third external circumferential surface 26 is positioned on the tip end side of the second external circumferential surface 25. The third external circumferential surface 26 includes the tip end of the pipe body 21. The third external circumferential surface 26 extends in the axial direction of the pipe body 21. The third external circumferential surface 26 is longer than the first external circumferential surface 24 in the axial direction of the pipe body 21. The third external circumferential surface 26 has an outer diameter that is smaller than that of the second external circumferential surface 25. A recessed portion 261 is provided in an intermediate portion in the axial direction of the third external circumferential surface 26. The contact piece 22 is attached to the recessed portion 261.

The pipe body 21 includes a cooling water channel thereinside. The cooling water channel passes through the pipe body 21 in the axial direction. The cooling water channel includes a first channel 211, a second channel 212, and a third channel 231. The first channel 211 reaches a base end surface 201 of the pipe body 21. The first channel 211 is inclined with respect to the axial direction of the pipe body 21 so as to become smaller in the radial direction toward the tip end.

The second channel 212 is positioned on the tip end side of the first channel 211. The second channel 212 is positioned between the first channel 211 and the third channel 231 in the axial direction of the pipe body 21. The second channel 212 is longer than the third channel 231 in the axial direction of the pipe body 21. The second channel 212 extends in the axial direction of the pipe body 21.

The third channel 231 is positioned on the tip end side of the second channel 212. The third channel 231 reaches a tip end surface 202 of the pipe body 21. The third channel 231 has an inner diameter that is greater than that of the second channel 212. The abovementioned protruding portion 67 of the electrode 6 is disposed inside the third channel 231.

The contact piece 22 is separate from the pipe body 21. The contact piece 22 is formed from an electrically conductive body. The contact piece 22 is attached in a detachable manner to the pipe body 21. The contact piece 22 is attached to the external circumferential surface of the pipe body 21. Specifically, the contact piece 22 is attached to the pipe body 21 by being fitted into the recessed portion 261 of the third external circumferential surface 26 of the pipe body 21.

The contact piece 22 includes an attachment portion 28 and a contact portion 29. The attachment portion 28 is attached to the external circumferential surface of the pipe body 21. The attachment portion 28 includes a first ring portion 281 and a second ring portion 282. The second ring portion 282 is disposed away from the first ring portion 281 in the axial direction of the contact piece 22. The first ring portion 281 and the second ring portion 282 are both fitted into the recessed portion 261 of the pipe body 21.

The contact portion 29 comes into contact with the internal circumferential surface of the electrode 6. The contact portion 29 has elasticity due to the generation of a counterforce when pressed in the radial direction of the contact piece 22. Specifically, the contact portion 29 includes a plurality of curved portions 291. The curved portions 291 are coupled to the first ring portion 281 and the second ring portion 282. The curved portions 291 have a plate-like shape that bulges outward in the radial direction of the contact piece 22. The contact portion 29 includes a plurality of slits 292. The slits 292 are provided between the plurality of curved portions 291 and extend in the axial direction of the contact piece 22. Only a portion of the slits 292 are given the reference numeral 292 in the drawings and the reference numerals of the other slits 292s are omitted.

Figure 28:
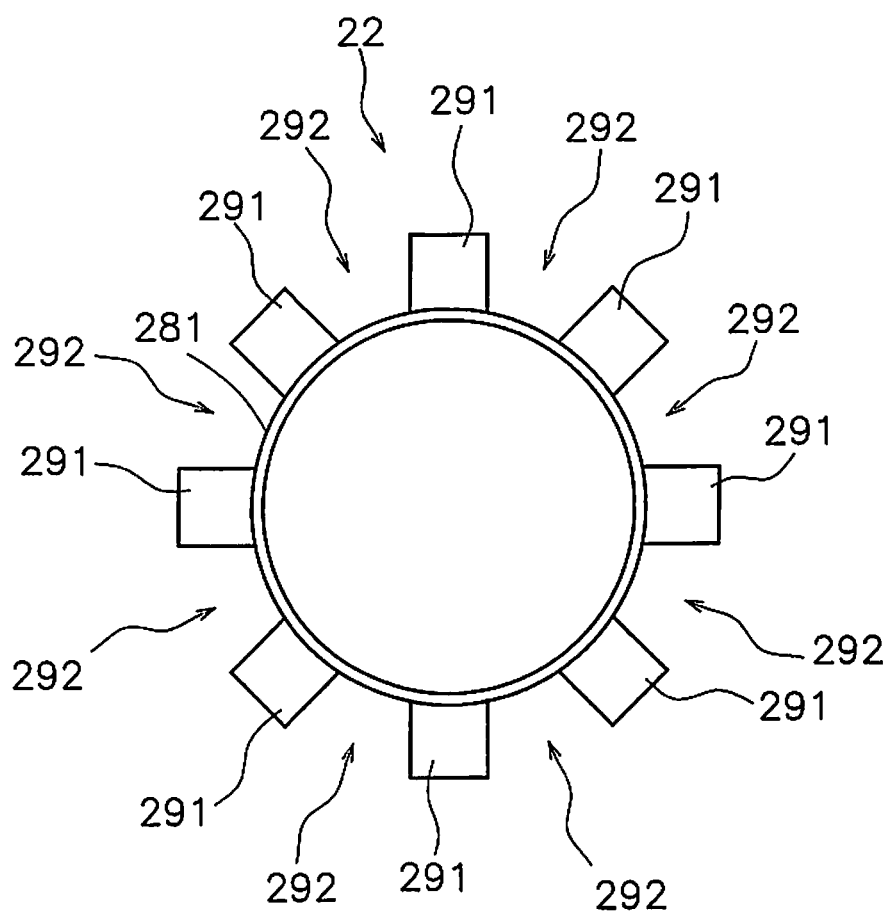
FIG. 28 is a view of the contact piece as seen from the axial direction.

FIG. 28 is a view of the contact piece 22 as seen from the axial direction. As illustrated in FIG. 28, the plurality of curved portions 291 are disposed at equal intervals in the circumferential direction of the contact piece 22. The plurality of slits 292 are similarly disposed at equal intervals in the circumferential direction of the contact piece 22. The contact piece 22 includes eight curved portions 291 and eight slits 292 in the present embodiment. However, the number of curved portions 291 is not limited to eight, and may be less than eight or more than eight. Similarly, the number of slits 292 is not limited to eight, and may be less than eight or more than eight.

As illustrated in FIG. 1, the flange portion of the center pipe 20 is disposed between a base end surface 341 of the electrode seat 34 and a bottom surface 331 of the hole of the base portion 33. The flange portion 23 comes into contact with the base end surface 341 of the electrode seat 34. As a result, the center pipe 20 and the electrode seat 34 are electrically connected. Moreover, the center pipe 20 is positioned in the radial direction and the axial direction.

Figure 29:
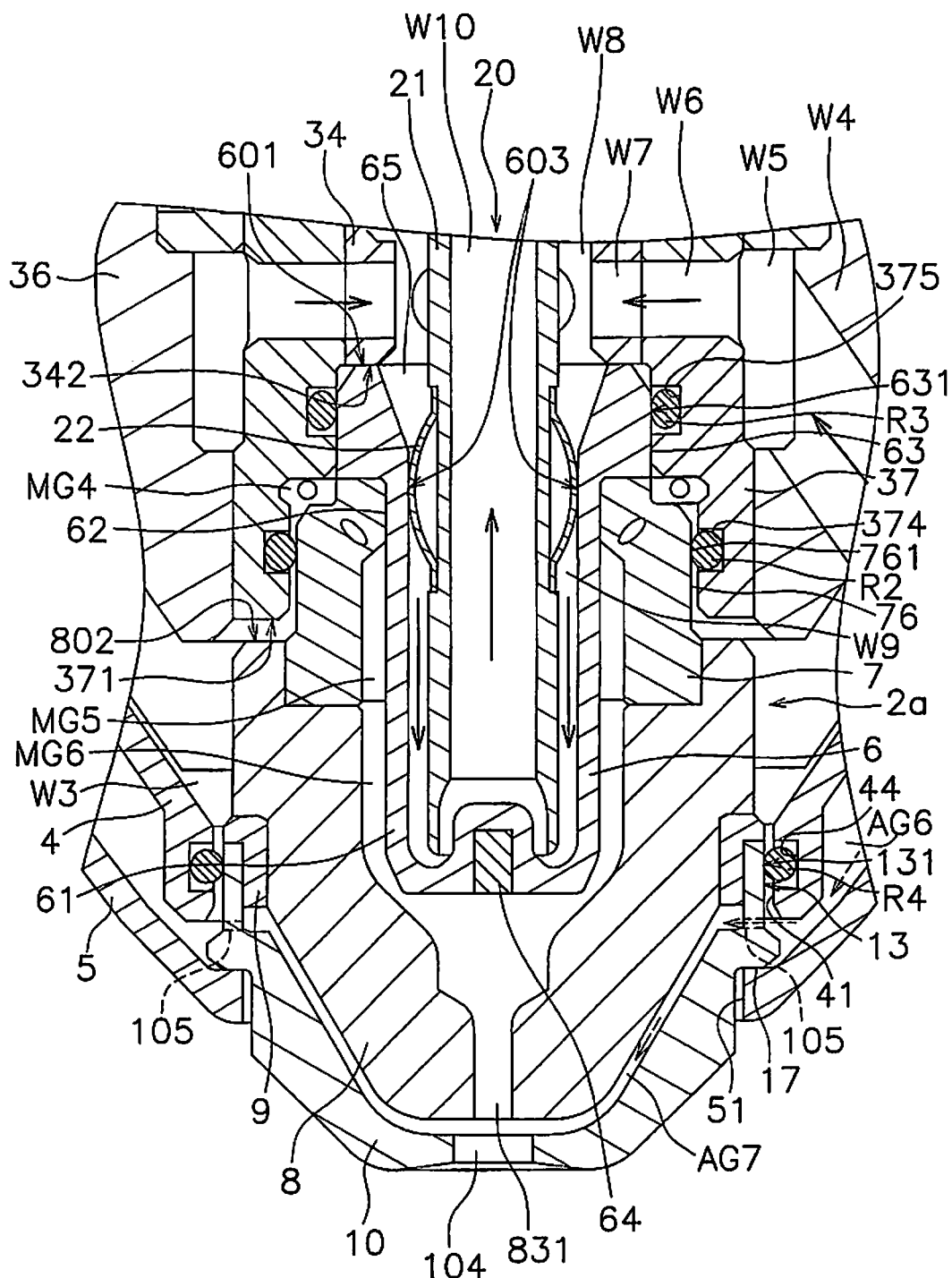
FIG. 29 is an enlarged view of the replacement part unit in FIG. 1 and the configuration of the vicinity of the same.

FIG. 29 is an enlarged view of the replacement part unit 2a in FIG. 1 and the configuration of the vicinity of the same. As illustrated in FIG. 29, the contact piece 22 of the center pipe 20 comes into contact with the internal circumferential surface of the electrode 6. The contact piece 22 is elastically deformed toward the inside in the radial direction due to the contact piece 22 being inserted into the internal channel 65 of the electrode 6. The contact piece 22 is pressed against the internal circumferential surface of the electrode 6 by the counterforce of the elastic deformation. The center pipe 20 and the electrode seat 34 are electrically connected. Therefore, the contact piece 22 comes into contact with the internal circumferential surface of the electrode 6 thereby energizing the electrode 6.

The electrode 6 includes a first energization surface 603 and a second energization surface 601. The first energization surface 603 is a portion that is in contact with the contact piece 22 on the internal circumferential surface of the internal channel 65. The electrode 6 is electrically connected with the electrode seat 34 via the center pipe 20 and the first energization surface 603. The first energization surface 603 is disposed adjoining the tapered portion 652 at the tip end side of the tapered portion 652. The first energization surface 603 is positioned inside the belowmentioned cooling water channel.

The second energization surface 601 is the base end surface 601 of the electrode 6. The second energization surface 601 comes into contact with a tip end surface 342 of the electrode seat 34. The electrode 6 is electrically connected with the electrode seat 34 via the second energization surface 601. The second energization surface 601 is adjacent to the belowmentioned cooling water channel.

1.3 Cooling Water Channel

The cooling water channel of the plasma torch 1a will be discussed next. The solid line arrows in FIG. 1 indicate the flow of the cooling water. As illustrated in FIG. 1, a cooling water supply pipe 45 is connected to the base portion 33. The cooling water supply pipe 45 is connected to a second cooling water channel W2 inside the nozzle seat 36 via a first cooling water channel W1 in the base portion 33. The first cooling water channel W1 extends from the base end surface of the base portion 33 toward the external circumferential surface of the base portion 33. The second cooling water channel W2 extends from the internal circumferential surface of the nozzle seat 36 toward the tip end portion of the nozzle seat 36. The second cooling water channel W2 is connected to a third cooling water channel W3. The third cooling water channel W3 is an annular channel enclosed by the nozzle seat 36, the first retainer cap 4, and the replacement part unit 2a.

As illustrated in FIG. 29, a gap is provided between a tip end surface 371 of the insulation sleeve 37 and the base end surface 802 of the nozzle 8, and the gap configures a portion of the third cooling water channel W3. Therefore, the base end surface 802 of the nozzle 8 is disposed inside the third cooling water channel W3. Moreover, the gap between the tip end surface 371 of the insulation sleeve 37 and the base end surface 802 of the nozzle 8 extends as far as the second external circumferential surface 76 of the insulation guide 7. Therefore, a portion of the second external circumferential surface 76 of the insulation guide 7 is disposed inside the third cooling water channel W3.

As illustrated in FIG. 1, the third cooling water channel W3 is connected to an eighth cooling water channel W8 via a fourth cooling water channel W4 inside the nozzle seat 36, a fifth cooling water channel W5 between the nozzle seat 36 and the insulation sleeve 37, a sixth cooling water channel W6 inside the insulation sleeve 37, and a seventh cooling water channel W7 inside the electrode seat 34.

The fourth cooling water channel W4 extends from the tip end of the nozzle seat 36 toward the internal circumferential surface of the nozzle seat 36. The fifth cooling water channel W5 is an annular channel provided between the nozzle seat 36 and the insulation sleeve 37. The sixth cooling water channel W6 is a plurality of channels extending in the radial direction from the external circumferential surface of the insulation sleeve 37 toward the internal circumferential surface of the insulation sleeve 37. The seventh cooling water channel W7 is a plurality of channels extending in the radial direction from the external circumferential surface of the electrode seat 34 toward the internal circumferential surface of the electrode seat 34. The eighth cooling water channel W8 is a channel between the electrode seat 34 and the center pipe 20.

The eighth cooling water channel W8 is connected to a ninth cooling water channel W9 between the electrode 6 and the center pipe 20. The ninth cooling water channel W9 communicates with a tenth cooling water channel W10 inside the center pipe 20 at the tip end portion of the center pipe 20. The tenth cooling water channel W10 is connected to a cooling water exhaust pipe 46 via an eleventh cooling water channel W11 inside the base portion 33.

The cooling water is supplied from a cooling water supply source, through the cooling water supply pipe 45, the first cooling water channel W1 in the base portion 33, and the second cooling water channel W2 in the nozzle seat 36, to the third cooling water channel W3. The cooling water passes from the third cooling water channel W3, through the fourth cooling water channel W4 inside the nozzle seat 36, the fifth cooling water channel W5 between the nozzle seat 36 and the insulation sleeve 37, the sixth cooling water channel W6 inside the insulation sleeve 37, and the seventh cooling water channel W7 inside the electrode seat 34, to the eighth cooling water channel W8 between the electrode seat 34 and the center pipe 20. The cooling water passes from the eighth cooling water channel W8, through the ninth cooling water channel W9 between the electrode 6 and the center pipe 20, the tenth cooling water channel W10 inside the center pipe 20, the eleventh cooling water channel W11 inside the base portion 33, and the cooling water exhaust pipe 46, to be exhausted to the outside of the plasma torch 1a.

1.4 Gas Channel

Figure 30:
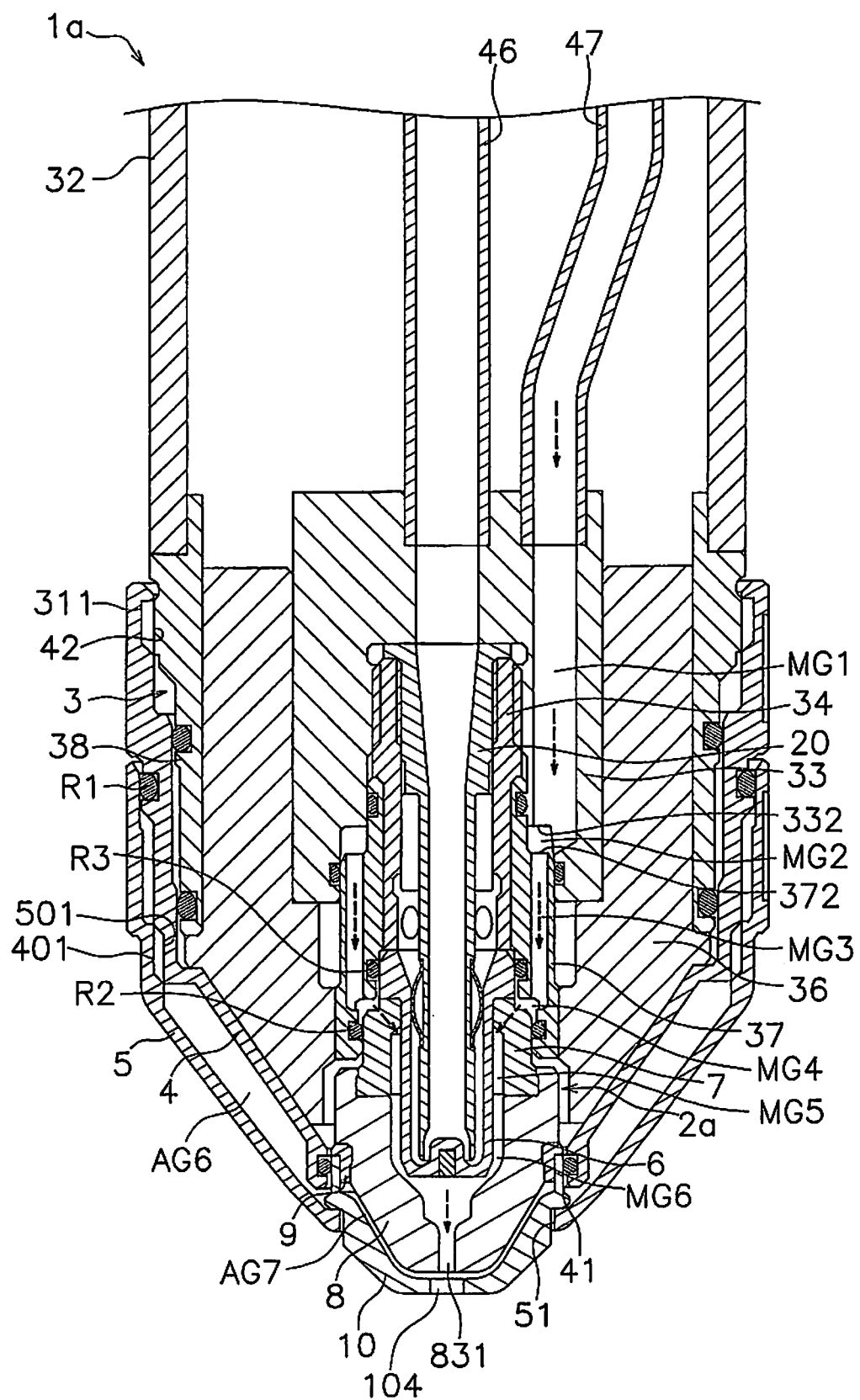
FIG. 30 is a cross-sectional view different from FIG. 1 along the center axis of a plasma torch.

The plasma gas channel of the plasma torch 1a will be discussed next. The plasma gas of the present embodiment is oxygen gas. However, another gas such as argon or nitrogen may be used. FIG. 30 is a cross-sectional view different from FIG. 1 along the center axis of a plasma torch. The dashed line arrows in FIGS. 1 and 30 indicate the flow of the plasma gas. Specifically, the dashed line arrows in FIG. 30 indicate the flow of the main gas. The dashed line arrows in FIG. 1 indicate the flow of the assist gas.

As illustrated in FIG. 30, a main gas supply pipe 47 is connected to the base portion 33. The main gas supply pipe 47 is connected to a second main gas channel MG2 between the base portion 33 and the insulation sleeve 37 via a first main gas channel MG1 inside the base portion 33. The first main gas channel MG1 extends in the axial direction from the base end surface of the base portion 33 toward a step portion 332 of the internal circumferential surface of the base portion 33. The second main gas channel MG2 is an annular channel formed between the step portion 332 of the internal circumferential surface of the base portion 33 and a step portion 372 of the external circumferential surface of the insulation sleeve 37.

The second main gas channel MG2 is connected to a fourth main gas channel MG4 via a third main gas channel MG3 inside the insulation sleeve 37. The third main gas channel MG3 extends in the axial direction from the step portion 372 of the external circumferential surface of the insulation sleeve 37. The fourth main gas channel MG4 is an annular channel between the insulation sleeve 37 and the replacement part unit 2a.

Figure 31:
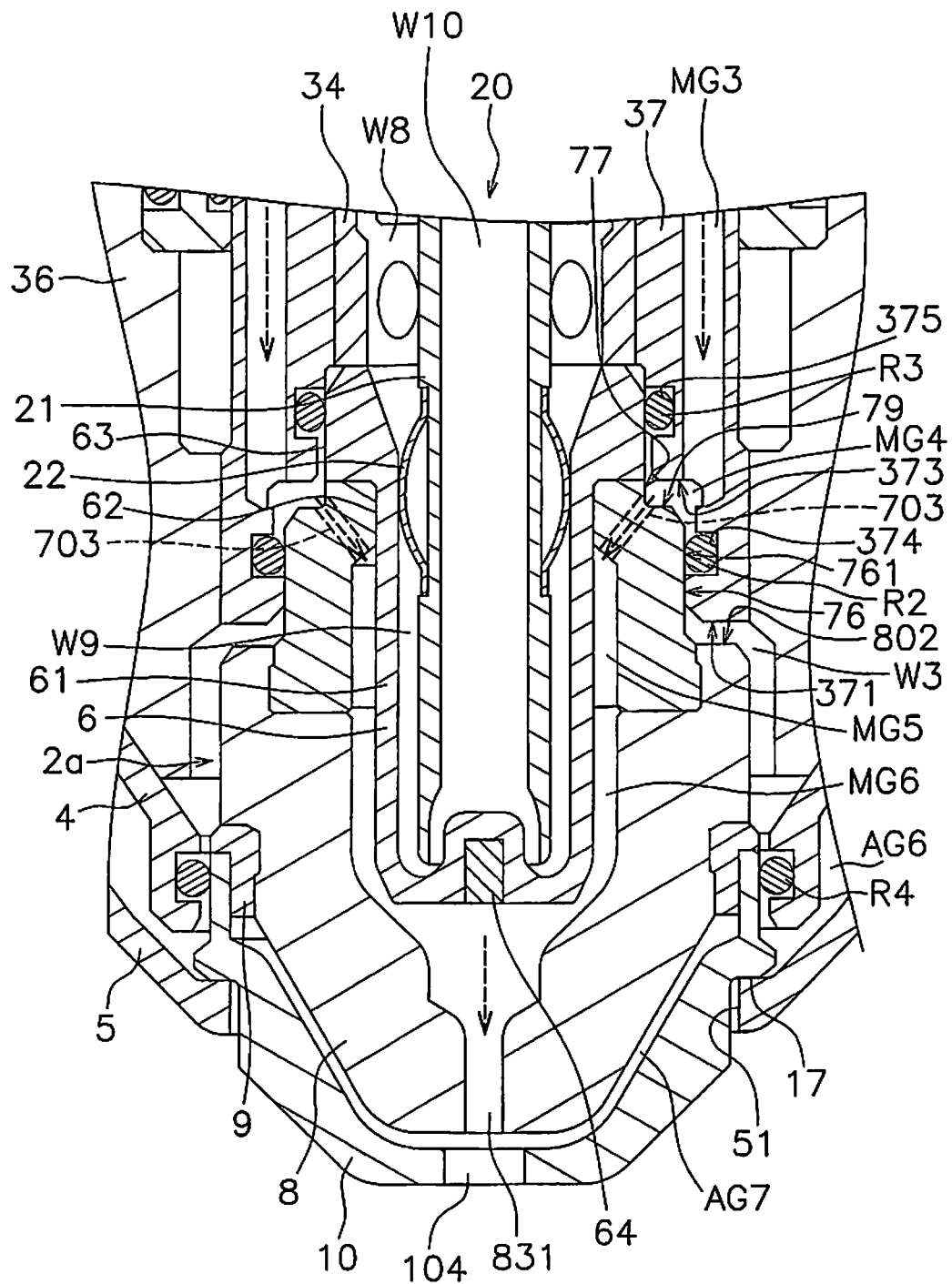
FIG. 31 is an enlarged view of the replacement part unit in FIG. 30 and a configuration of the vicinity of the same.

FIG. 31 is an enlarged view of the replacement part unit 2a in FIG. 30 and the configuration of the vicinity of the same. As illustrated in FIG. 31, the fourth main gas channel MG4 is configured by the internal circumferential surface of the insulation sleeve 37, the external circumferential surface of the insulation guide 7, and the external circumferential surface of the electrode 6.

Specifically, a step portion 373 is provided on the internal circumferential surface of the insulation sleeve 37. The step portion 373 is a surface perpendicular to the axial direction of the insulation sleeve 37. While the replacement part unit 2a is attached to the torch body 3, the outside step portion 79 of the insulation guide 7 is disposed away from the step portion 373 in the internal circumferential surface of the insulation sleeve 37 with a gap therebetween. The fourth main gas channel MG4 passes through the gap between the outside step portion 79 of the insulation guide 7 and the step portion 373 of the internal circumferential surface of the insulation sleeve 37.

The fourth main gas channel MG4 is sealed from the abovementioned third cooling water channel W3 by an O-ring R2. The O-ring R2 is fitted into a recessed portion 374 provided on the internal circumferential surface of the insulation sleeve 37. The O-ring R2 comes into contact with a portion of the second external circumferential surface 76 of the insulation guide 7. That is, the second external circumferential surface 67 of the insulation guide 7 includes a seal surface 761 that is in contact with the O-ring. A portion of the second external circumferential surface 76 on the tip end side of the seal surface 761 is disposed inside the third cooling water channel W3. A portion of the second external circumferential surface 76 on the base end side of the seal surface 761 is disposed inside the fourth main gas channel MG4. The third external circumferential surface 77 is also disposed inside the fourth main gas channel MG4 in the same way as the second external circumferential surface 76.

As illustrated in FIG. 29, the fourth main gas channel MG4 is sealed from the abovementioned sixth cooling water channel W6 and the seventh cooling water channel W7 by an O-ring R3. The O-ring R3 is fitted into a recessed portion 375 provided on the internal circumferential surface of the insulation sleeve 37. The O-ring R3 comes into contact with a portion of the external circumferential surface of the flange portion 63 of the electrode 6. That is, the external circumferential surface of the flange portion 63 includes a seal surface 631 that comes into contact with the O-ring R3. A portion of the external circumferential surface of the flange portion 63 on the tip end side of the seal surface 631 is disposed inside the fourth main gas channel MG4.

As illustrated in FIG. 31, the fourth main gas channel MG4 is connected to a fifth main gas channel MG5 between the insulation guide 7 and the electrode 6 via the plurality of communication channels 703 of the insulation guide 7. The fifth main gas channel MG5 is an annular channel between the internal circumferential surface of the insulation guide 7 and the external circumferential surface of the electrode 6. The fifth main gas channel MG5 is connected to a sixth main gas channel MG6 between the nozzle 8 and the electrode 6. The inner diameter of the fifth main gas channel MG5 is the same as the inner diameter of the sixth main gas channel MG6. The sixth main gas channel MG6 communicates with the jetting hole 831 of the nozzle 8.

The main gas flows from the main gas supply source, through the first main gas channel MG1 inside the base portion 33, the second main gas channel MG2 between the base portion 33 and the insulation sleeve 37, and the third main gas channel MG3 inside the insulation sleeve 37, to the fourth main gas channel MG4 between the insulation sleeve 37 and the replacement part unit 2a. The main gas produces a swirling flow by passing from the fourth main gas channel MG4 through the communication channels 703, and is jetted into the fifth main gas channel MG5. The main gas that has produced the swirling flow passes through the sixth main gas channel MG6 and is jetted from the jetting hole 831 of the nozzle 8.

As illustrated in FIG. 1, an assist gas supply pipe 48 is connected to the base portion 33. The assist gas supply pipe 48 is connected to a second assist gas channel AG2 inside the nozzle seat 36 via a first assist gas channel AG1 inside the base portion 33. The first assist gas channel AG1 extends from the base end surface of the base portion 33 toward the external circumferential surface of the base portion 33. The second assist gas channel AG2 extends from the internal circumferential surface of the nozzle seat 36 toward the external circumferential surface of the nozzle seat 36.

The second assist gas channel AG2 is connected to a fourth assist gas channel AG4 between the holder 38 and the second retainer cap 5 via a third assist gas channel AG3 inside the holder 38. The third assist gas channel AG3 extends from the internal circumferential surface toward the external circumferential surface of the holder 38. The fourth assist gas channel AG4 is an annular channel between the external circumferential surface of the holder 38 and the internal circumferential surface of the second retainer cap 5.

The fourth assist gas channel AG4 is connected to a sixth assist gas channel AG6 between the first retainer cap 4 and the second retainer cap 5 via a fifth assist gas channel AG5 inside the second retainer cap 5. The fifth assist gas channel AG5 is a plurality of channels that extend from the internal circumferential surface toward the external circumferential surface of the second retainer cap 5. The sixth assist gas channel AG6 is an annular channel between the internal circumferential surface of the first retainer cap 4 and the external circumferential surface of the second retainer cap 5.

As illustrated in FIG. 29, the sixth assist gas channel AG6 is connected to a seventh assist gas channel AG7 between the nozzle 8 and the shield cap 10 via the plurality of communication channels 105 in the shield cap 10. The seventh assist gas channel AG7 communicates with the jetting hole 831 of the nozzle 8 and the jetting hole 104 of the shield cap 10.

The sixth assist gas channel AG6 is sealed from the abovementioned third cooling water channel W3 by an O-ring R4. The O-ring R4 is fitted into a recessed portion 44 provided at the tip end portion on the internal circumferential surface of the first retainer cap 4. The O-ring R4 comes into contact with the first external circumferential surface 13 of the shield cap 10. That is, the first external circumferential surface 13 of the shield cap 10 includes a seal surface 131 that comes into contact with the O-ring R4.

The insulation ring 9 is coupled to the nozzle 8 by press-fitting as mentioned above. The insulation ring 9 is also coupled to the shield cap 10 by press-fitting. Consequently, the seventh assist gas channel AG7 is sealed from the abovementioned third cooling water channel W3 by the insulation ring 9.

The assist gas flows from the assist gas supply source, through the first assist gas channel AG1 inside the base portion 33, the second assist gas channel AG2 inside the nozzle seat 36, the third assist gas channel AG3 inside the holder 38, the fourth assist gas channel AG4 between the holder 38 and the second retainer cap 5, and the fifth assist gas channel AG5 inside the second retainer cap 5, to the sixth assist gas channel AG6 between the first retainer cap 4 and the second retainer cap 5. The assist gas passes from the sixth assist gas channel AG6 through the communication channels 105 to produce a swirling flow, and is jetted into the seventh assist gas channel AG7. The assist gas that produces the swirling flow passes through the seventh assist gas channel AG7 and is jetted from the jetting hole 104 of the shield cap along with the main gas.

1.5 Replacement Method of Replacement Part Unit

A replacement method of the replacement part unit 2a will be discussed next. The replacement part unit 2a is a consumable. As a result, the replacement part unit 2a is attached to the torch body 3 in a detachable manner and is replaced with a new unit when wear advances to the extent that replacement is necessary. As illustrated in FIG. 29, the step portion 17 of the shield cap 10 is pressed in the axial direction by the edge portion of the opening 51 of the second retainer cap 5 in the plasma torch 1a. Furthermore, the flange portion 14 of the shield cap 10 is clamped between the edge portion of the opening 41 of the first retainer cap 4 and the edge portion of the opening 51 of the second retainer cap 5. As a result, the replacement part unit 2a is fixed. Consequently, the second retainer cap 5 is removed first when replacing the replacement part unit 2a.

While the second retainer cap 5 is removed, the replacement part unit 2a is held by the elastic force of the O-rings R2, R3, and R4. Therefore, the insulation guide 7 and the electrode 6 of the replacement part unit 2a are drawn away from the insulation sleeve 37 by drawing the replacement part unit 2a from the opening 41 of the first retainer cap 4 toward the tip end side. At this time, the contact piece 22 of the center pipe 20 slides along the internal circumferential surface of the electrode 6 and the electrode 6 is pulled out from the center pipe 20.

The first retainer cap 4 may be loosened before drawing the replacement part unit 2a from the opening 41 of the first retainer cap 4 toward the tip end side. As a result, the flange portion 14 of the shield cap 10 is caught on the edge portion of the opening 41 of the first retainer cap 4 and pushed out. Consequently, the replacement part unit 2a can be removed easily.

As discussed above, the replacement part unit 2a can be removed easily in an integrated manner from the torch body 3.

When attaching a new replacement part unit 2a, the replacement part unit 2a is inserted from the opening 41 of the first retainer cap 4 toward the base end side. As a result, the electrode 6 and the insulation guide 7 of the replacement part unit 2a are inserted into the insulation sleeve 37. At this time, the center pipe 20 is inserted into the electrode 6 and the contact piece 22 of the center pipe 20 slides along the internal circumferential surface of the electrode 6.

When the second retainer cap 5 is attached onto the first retainer cap 4, the edge portion of the opening 51 of the second retainer cap 5 presses the step portion 17 of the shield cap 10 toward the base end side. As a result, the replacement part unit 2a is pushed in toward the base end side until the base end surface 601 of the electrode 6 comes into contact with the tip end surface 342 of the electrode seat 34. Furthermore, the flange portion 14 of the shield cap 10 is clamped and held by the edge portion of the opening 41 of the first retainer cap 4 and the edge portion of the opening 51 of the second retainer cap 5, whereby the replacement part unit 2a is secured.

The electrode 6, the insulation guide 7, and the nozzle 8 are integrated and are coupled together in the replacement part unit 2a as discussed above so as to prevent disassembly by a general user. As a result, the electrode 6, the insulation guide 7, and the nozzle 8 can be replaced at the same time in an integrated manner by replacing the replacement part unit 2a. Further, because the electrode 6, the insulation guide 7, and the nozzle 8 are coupled by press-fitting, the electrode 6, the insulation guide 7, and the nozzle 8 can be coupled without gaps without the use of O-rings. Accordingly, the concentricity of the electrode 6 and the nozzle 8 can be improved.

The flange portion 63 of the electrode 6 includes the base end of the electrode 6. That is, the electrode 6 does not have a portion that extends from the flange portion 63 toward the base end side. In order to provide a thread or a contact piece on the electrode side for assuring energization between the electrode and the electrode seat, the electrode in a conventional plasma torch includes a portion that extends from the flange portion toward the base end side. The electrode 6 can be made in a more compact manner in the present embodiment in comparison to the electrode of the conventional plasma torch. As a result, an increase in the size of the entire replacement part unit 2a including the electrode 6 can be suppressed.

Moreover, the portion that extends to the base end side of the abovementioned electrode in the conventional plasma torch serves as an energization surface with the electrode seat. While the electrode 6 as in the present embodiment does not have a portion that extends to the base end side of the electrode as in the prior art, the electrode 6 includes the first energization surface 603 that comes into contact with the center pipe 20 in the internal channel. As a result, the electrode 6 can be energized in a stable manner.

The flange portion 63 of the electrode 6 is longer than the coupling portion 62 in the axial direction of the electrode 6. By increasing the size of the flange portion 63 of the electrode 6 in the axial direction in this way, the external circumferential surface of the flange portion 63 can be used as the seal surface 631 that comes into contact with the O-ring R3.

The first external circumferential surface 75 of the insulation guide 7 is shorter than the second external circumferential surface 76 in the axial direction of the insulation guide 7. In other words, the second external circumferential surface 76 of the insulation guide 7 is longer than the first external circumferential surface 75 in the axial direction of the insulation guide 7. By increasing the size of the second external circumferential surface 76 of the insulation guide 7 in the axial direction in this way, the second external circumferential surface 76 of the insulation guide 7 can be used as the seal surface 761 that comes into contact with the O-ring R2.

By using the second external circumferential surface 76 of the insulation guide 7 as the seal surface 761, the portion of the second external circumferential surface 76 on the tip end side of the seal surface 761 can be disposed inside the third cooling water channel W3. In this way, the portion of the second external circumferential surface 76 of the insulation guide 7 is disposed inside the third cooling water channel W3 whereby the insulation guide 7 can be cooled effectively.

The second nozzle portion 82 whose wall thickness is large is longer in the axial direction of the nozzle 8 than the first nozzle portion 81 whose wall thickness is small. That is, the second nozzle portion 82 whose wall thickness is large and which is near the tip end of the electrode 6 that has a higher temperature can be made greater in the axial direction. Accordingly, the heat resistance of the nozzle 8 can be improved.

The base end surface 802 of the nozzle 8 is disposed inside the third cooling water channel W3. As a result, the nozzle 8 is cooled effectively.

The insulation guide 7 is formed with a material that deforms easily. That is, the insulation guide 7 is formed with a resin and has a modulus of elasticity that is less than the modulus of elasticity of a ceramic. As a result, coupling by press-fitting can be carried out more easily than with a ceramic, and the sealability can be improved. Moreover, the cost of the insulation guide 7 can be reduced in comparison to a ceramic insulation guide. Therefore, an increase in costs can be suppressed even when replacing the electrode 6, the insulation guide 7, and the nozzle 8 in an integrated manner.

The resin insulation guide 7 has a smaller modulus of elasticity and deforms more easily than a ceramic which is generally used for insulation guides. As a result, the resin insulation guide 7 can serve as a fluid seal due to the deformation of the insulation guide 7 without the need for O-rings as in the case of a ceramic guide, in order to provide a seal between the insulation guide 7 and the electrode 6 and between the insulation guide 7 and the nozzle 8. Therefore, the structure of the torch is simplified by omitting the O-rings in addition to being able to manufacture the insulation guide 7 with a resin which is less expensive than a ceramic.

While the resin insulation guide 7 is less expensive than a ceramic insulation guide 7, there is a concern of thermal effects on the insulation guide 7 because the heat resistance is reduced. However, the first external circumferential surface 75 of the insulation guide 7 is shorter than the second external circumferential surface 76 in the axial direction of the insulation guide 7. By making the first external circumferential surface 75 of the insulation guide 7 shorter in this way, the tip end of the insulation guide 7 can be disposed further away from the vicinity of the tip end of the electrode 6 which has a high temperature. As a result, the thermal effects on the insulation guide 7 can be reduced.

The flange portion 14 of the shield cap 10 is clamped and held by the edge portion of the opening 41 of the first retainer cap 4 and the edge portion of the opening 51 of the second retainer cap 5, whereby the replacement part unit 2a is secured. As a result, the replacement part unit 2a can be removed easily by loosening the first retainer cap 4 as discussed above. Moreover, the replacement part unit 2a can be attached easily by attaching the second retainer cap 5 to the first retainer cap 4.

In order to accurately position the replacement part unit 2a with the center axis of the torch body 3, it is desirable that the gap between the replacement part unit 2a and the torch body 3 is reduced as much as possible and the restraining force from the O-rings is as strong as possible. As a result however, there is a concern that workability would be reduced if a large force were required to attach and detach the replacement part unit 2a. In particular, there is a concern that workability would be reduced if a tool for attaching and detaching the replacement part unit 2a were required. However, as discussed above, the replacement part unit 2a can be attached and detached easily with the first retainer cap 4 and the second retainer cap 5 in the replacement part unit 2a as in the present embodiment. As a result, the replacement part unit 2a can be attached and detached easily without the use of a tool. Accordingly, workability can be improved.

2. Second Embodiment

Figure 32:
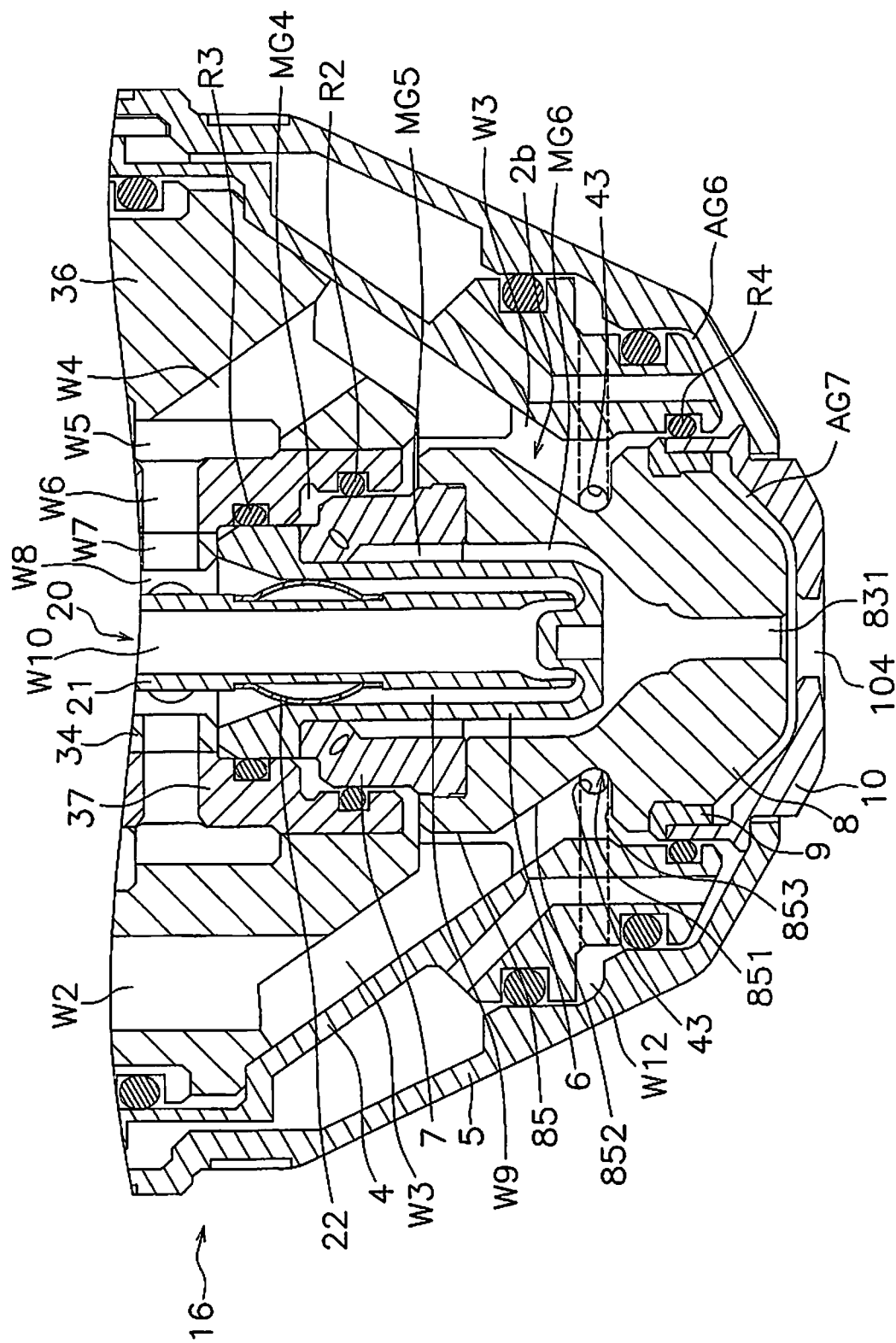
FIG. 32 is a cross-sectional view along the center axis of a plasma torch according to a second embodiment.
Figure 33:
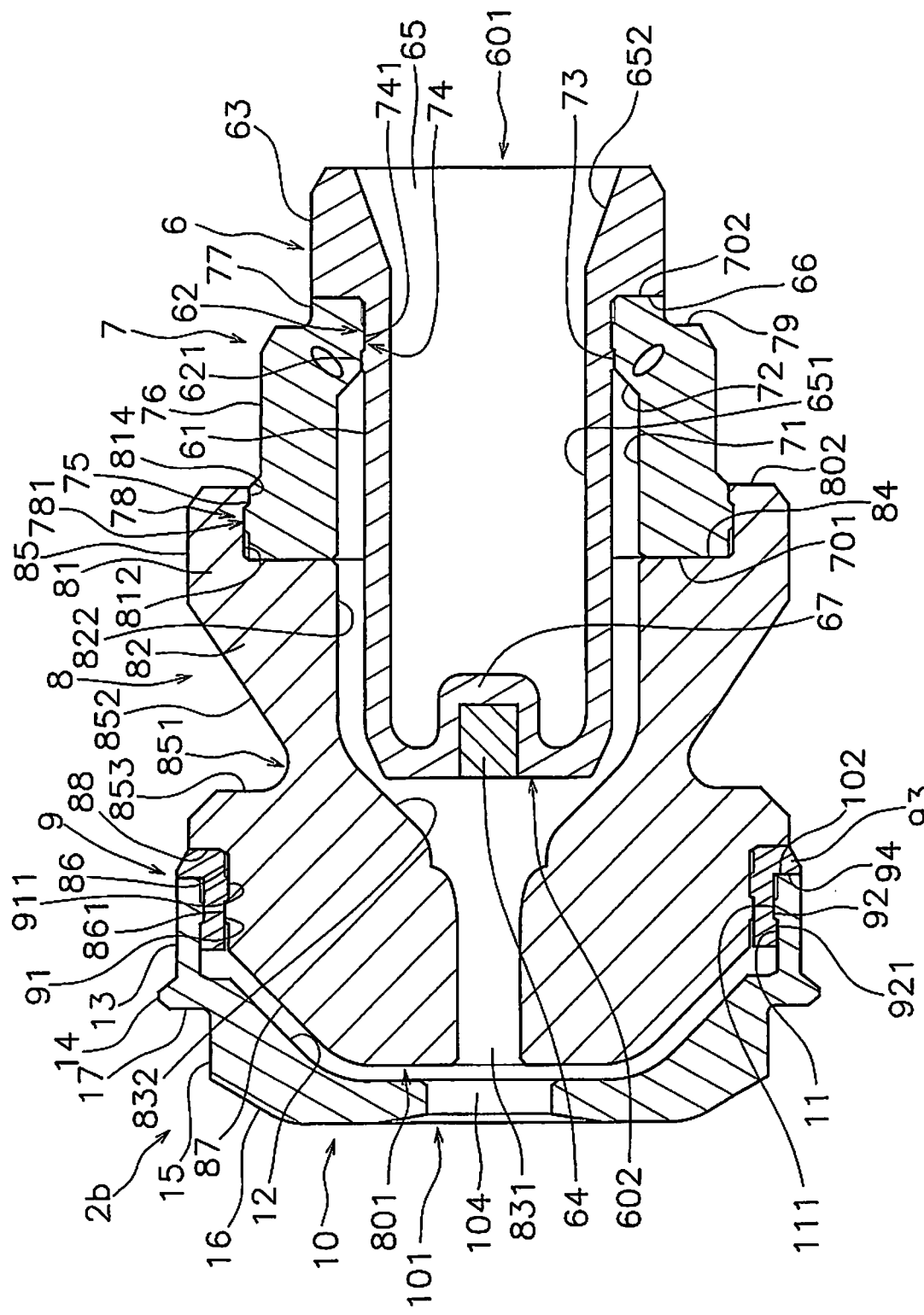
FIG. 33 is a cross-sectional view of a replacement part unit according to the second embodiment.
Figure 34:
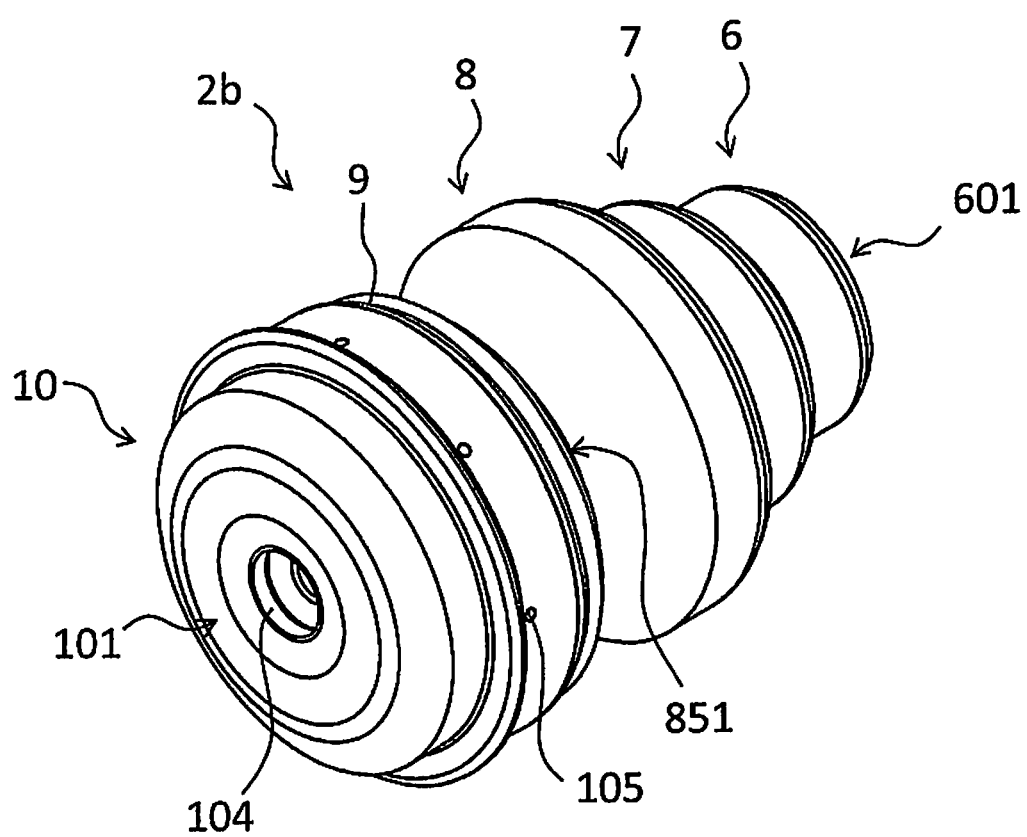
FIG. 34 is a perspective view of the replacement part unit according to the second embodiment.
Figure 35:
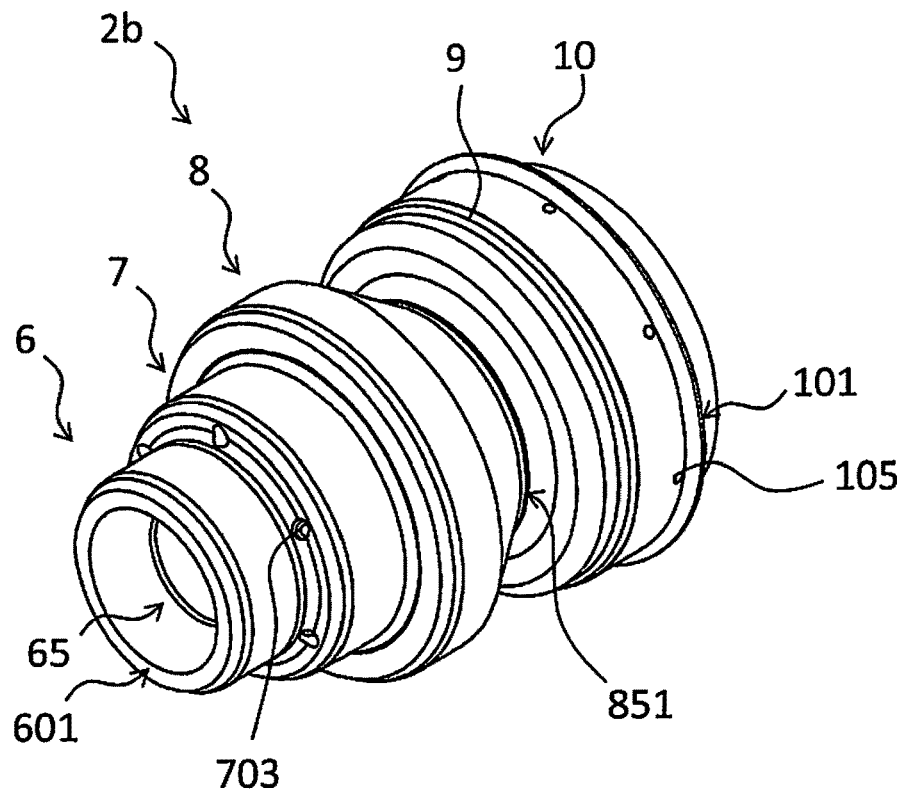
FIG. 35 is a perspective view of the replacement part unit according to the second embodiment.
Figure 36:
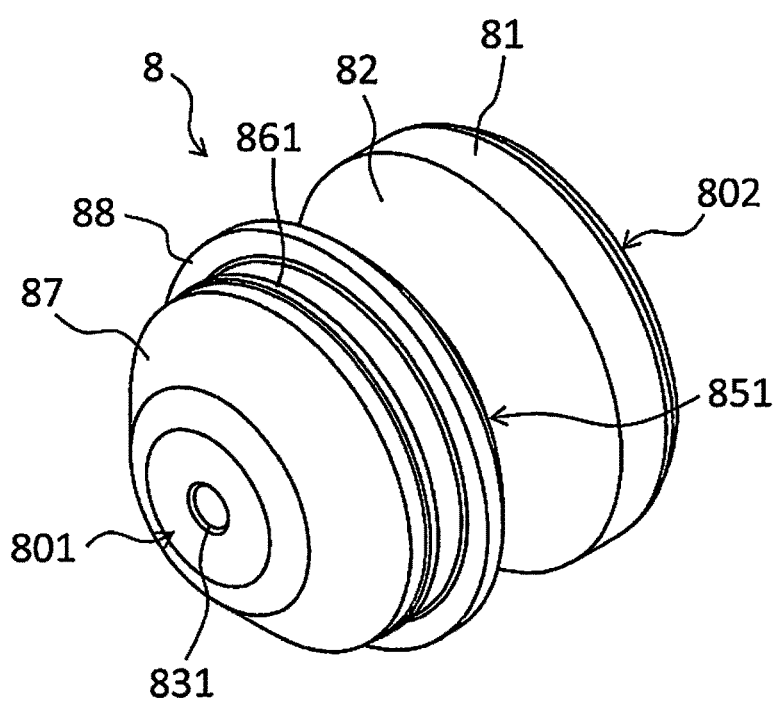
FIG. 36 is a perspective view of the nozzle according to the second embodiment.
Figure 37:
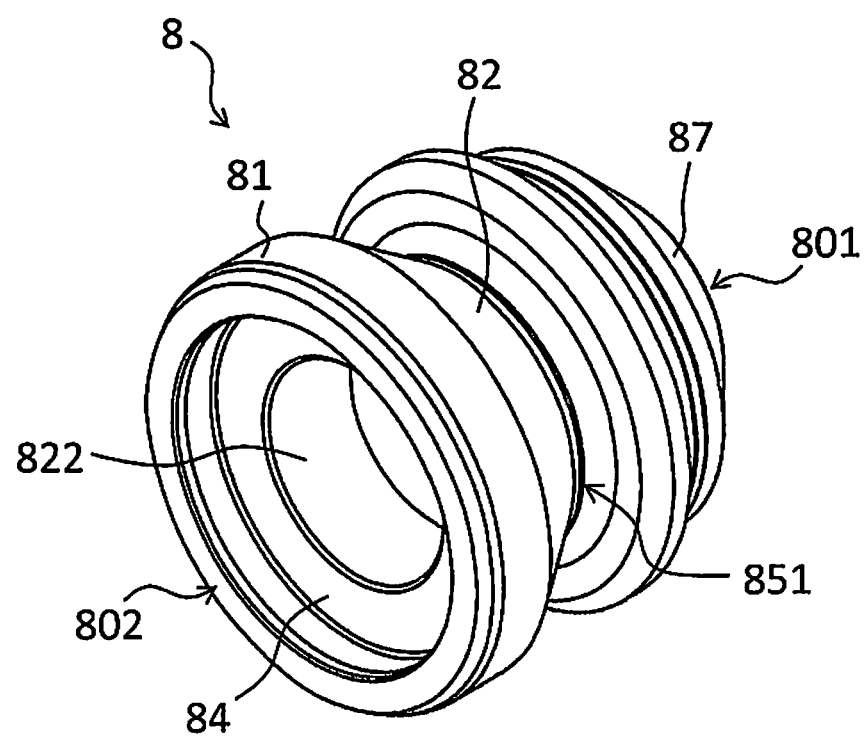
FIG. 37 is a perspective view of the nozzle according to the second embodiment.

A plasma torch 1b as in a second embodiment will be discussed next. FIG. 32 is a cross-sectional view along the center axis of the plasma torch 1b according to the second embodiment. FIG. 33 is a cross-sectional view of the replacement part unit 2b according to the second embodiment. FIGS. 34 and 35 are perspective views of the replacement part unit 2b. FIGS. 36 and 37 are perspective views of the nozzle 8 according to the second embodiment.

As illustrated in FIG. 33, the first external circumferential surface 85 of the nozzle 8 includes a recessed portion 851. The recessed portion 851 is provided on the second nozzle portion 82. The recessed portion 851 is recessed toward the inside in the radial direction of the nozzle 8 and extends in the circumferential direction of the nozzle 8. The recessed portion 851 is disposed at approximately the same position as the tip end of the electrode 6 in the axial direction of the nozzle 8. The outer diameter of the bottom portion of the recessed portion 851 is smaller than the inner diameter of the internal circumferential surface 812.

The recessed portion 851 includes a first wall surface 852 on the base end side and a second wall surface 853 on the tip end side. The first wall surface 852 is inclined with respect to the radial direction of the nozzle 8. The second wall surface 853 extends in the radial direction of the nozzle 8. As illustrated in FIG. 32, the first wall surface 852 extends parallel to the inclined internal circumferential surface of the first retainer cap 4. The recessed portion 851 is disposed inside the third cooling water channel W3.

In the present embodiment, a plurality of holes 43 that communicate with the third cooling water channel W3 are provided in the first retainer cap 4. The holes 43 of the first retainer cap 4 communicate with an annular cooling water channel W12 between the first retainer cap 4 and the second retainer cap 5. The recessed portion 851 is disposed at approximately the same position as the holes 43 of the first retainer cap 4 in the axial direction of the nozzle 8.

Other configurations of the replacement part unit 2b and the plasma torch 1b are the same as those of the replacement part unit 2a and the plasma torch 1a of the first embodiment.

According to the abovementioned second embodiment, the recessed portion 851 is provided in the nozzle 8 whereby a greater surface area of the nozzle 8 comes into contact with the cooling water. As a result, the cooling performance of the nozzle 8 can be improved. Moreover, because the recessed portion 851 is disposed at approximately the same position as the holes 43 of the first retainer cap 4, the cooling performance of the nozzle 8 can be further improved. Further, the cooling water channel W12 is also able to supply cooling water to the second retainer cap 5. As a result, the replacement part unit 2b according to the present embodiment is suitable for plasma cutting using a high electric current.

3. Other Embodiments

Although embodiments of the present invention have been described so far, the present invention is not limited to the above embodiments and various modifications may be made within the scope of the invention.

The structures of the replacement part units 2a and 2b may be changed. The structures of the torch body 3, the first retainer cap 4, and the second retainer cap 5 may also be changed.

The electrode 6 and the insulation guide 7 may be coupled by adhesion instead of press-fitting. The insulation guide 7 and the nozzle 8 may be coupled by adhesion instead of press-fitting. The nozzle 8 and the insulation ring 9 may be coupled by adhesion instead of press-fitting. The insulation ring 9 and the shield cap 10 may be coupled by adhesion instead of press-fitting.

The insulation ring 9 and the shield cap 10 may not be included in the replacement part units 2a and 2b. That is, the replacement part unit may be configured by the electrode 6, the insulation guide 7, and the nozzle 8. Further, the insulation ring 9 and the shield cap 10 may be attached to the replacement part unit in an easily detachable manner.

Figure 38:
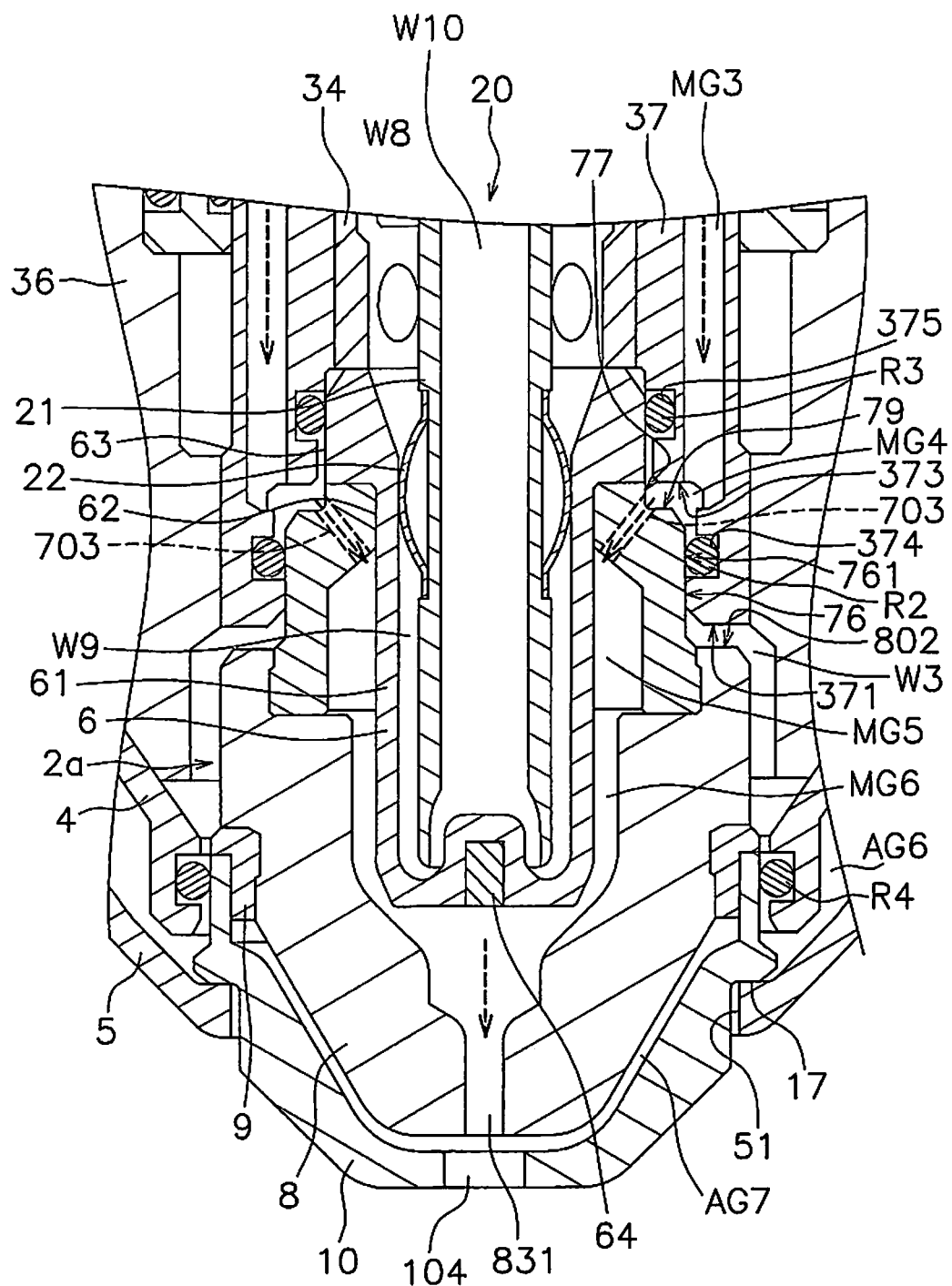
FIG. 38 is a cross-sectional view along the center axis of a plasma torch according to another embodiment.

The inner diameter of the gas channel inside the insulation guide 7 may be greater than the inner diameter of the nozzle 8. That is, the inner diameter of the fifth main gas channel MG5 inside the insulation guide 7 may be greater than the inner diameter of the sixth main gas channel MG6 inside the nozzle 8 as illustrated in FIG. 38.

INDUSTRIAL APPLICABILITY

According to the present invention, concentricity between the electrode and the nozzle can be improved and the replacement part unit for a plasma torch, the electrode, the insulation guide, and the nozzle that can be replaced easily can be provided.

What is claimed is:

1. A replacement part unit for a plasma torch, the replacement part unit comprising:
an electrode including
an electrode body portion including a tip end of the electrode,
a flange portion including a base end of the electrode, and
a coupling portion disposed between the electrode body portion and the flange portion, the coupling portion including a first protrusion formed on an external circumferential surface of the electrode and extending in a circumferential direction of the replacement part unit,
an outer diameter of the flange portion being larger than an outer diameter of the coupling portion;
an insulation guide made of a resin material and coupled to the electrode by press-fitting without an O-ring such that an internal circumferential surface of the insulation guide contacts an external circumferential surface of the electrode, the insulation guide including
a hole into which the electrode is inserted, and
a second protrusion formed on the internal circumferential surface of the insulation guide in a position closer to a base end of the insulation guide than to a tip end of the insulation guide in the axial direction, the second protrusion extending in the circumferential direction and having an inner diameter smaller than an outer diameter of the first protrusion,
the insulation guide being configured to be coupled to the electrode by inserting the tip end of the electrode into the hole of the insulation guide such that the first protrusion passes by the second protrusion and the second protrusion becomes disposed between the first protrusion and the flange portion; and
a nozzle including a hole into which the insulation guide is inserted, the nozzle being coupled to the insulation guide by press-fitting without an O-ring such that an external circumferential surface of the insulation guide contacts an internal circumferential surface of the nozzle.

2. The replacement part unit for a plasma torch according to claim 1, wherein
the external circumferential surface of the electrode has an uneven shape that engages with the internal circumferential surface of the insulation guide.

3. The replacement part unit for a plasma torch according to claim 1, wherein
the internal circumferential surface of the insulation guide has an uneven shape that engages with the external circumferential surface of the electrode.

4. The replacement part unit for a plasma torch according to claim 1, wherein
the external circumferential surface of the insulation guide has an uneven shape that engages with the internal circumferential surface of the nozzle.

5. The replacement part unit for a plasma torch according to claim 1, wherein
the internal circumferential surface of the nozzle has an uneven shape that engages with the external circumferential surface of the insulation guide.

6. The replacement part unit for a plasma torch according to claim 1, wherein
the coupling of the electrode and the insulation guide forms a fluid seal without an O-ring.

7. The replacement part unit for a plasma torch according to claim 1, wherein
the coupling of the nozzle and the insulation guide without an O-ring forms a fluid seal.

8. The replacement part unit for a plasma torch according to claim 1, wherein
the resin material has a modulus of elasticity that is less than a modulus of elasticity of a ceramic.

9. The replacement part unit for a plasma torch according to claim 1, wherein
an external circumferential surface of the flange portion includes a seal surface that comes into contact with an O-ring.

10. The replacement part unit for a plasma torch according to claim 1, wherein
the flange portion is longer than the coupling portion as measured along an axial direction of the electrode.

11. The replacement part unit for a plasma torch according to claim 1, wherein
the external circumferential surface of the insulation guide includes
a first external circumferential surface disposed inside the nozzle and coupled to the nozzle, and
a second external circumferential surface positioned on a base end side of the first external circumferential surface and disposed outside of the nozzle, and
the first external circumferential surface is shorter than the second external circumferential surface as measured along an axial direction of the insulation guide.

12. The replacement part unit for a plasma torch according to claim 11, wherein
the second external circumferential surface includes a seal surface that comes into contact with an O-ring.

13. The replacement part unit for a plasma torch according to claim 12, wherein
a portion of the second external circumferential surface on a tip end side of the seal surface is disposed inside a cooling water channel of the plasma torch.

14. The replacement part unit for a plasma torch according to claim 11, wherein
the external circumferential surface of the insulation guide further includes a third external circumferential surface positioned on the base end side of the second external circumferential surface and having an outer diameter less than an outer diameter of the second external circumferential surface, and
the third external circumferential surface is disposed inside a gas channel of the plasma torch.

15. The replacement part unit for a plasma torch according to claim 1, wherein
the nozzle includes
a first nozzle portion coupled to the insulation guide, and
a second nozzle portion positioned on a tip end side of the first nozzle portion, the second nozzle portion having a wall thickness in a radial direction greater than a wall thickness of the first nozzle portion and facing the electrode, and
the second nozzle portion is longer than the first nozzle portion as measured along an axial direction of the nozzle.

16. The replacement part unit for a plasma torch according to claim 1, wherein
a base end portion of the nozzle is disposed inside a cooling water channel of the plasma torch.

17. The replacement part unit for a plasma torch according to claim 1, wherein,
the external circumferential surface of the nozzle includes a recessed portion that is recessed inward in a radial direction of the nozzle and extends in a circumferential direction of the nozzle.

18. The replacement part unit for a plasma torch according to claim 17, wherein
the recessed portion is disposed at approximately a same position as a tip end of the electrode along an axial direction of the nozzle.

19. The replacement part unit for a plasma torch according to claim 17, wherein
the plasma torch includes a retainer cap disposed so as to cover the nozzle,
the recessed portion is disposed inside a cooling water channel between an internal circumferential surface of the retainer cap and the external circumferential surface of the nozzle,
a hole that communicates with the cooling water channel is provided in the retainer cap, and
the recessed portion is disposed at approximately a same position as the hole of the retainer cap along an axial direction of the nozzle.

20. The replacement part unit for a plasma torch according to claim 19, wherein
a wall surface of a base end side of the recessed portion is inclined with respect to the radial direction of the nozzle and extends parallel to the internal circumferential surface of the retainer cap.

21. The replacement part unit for a plasma torch according to claim 17, wherein
a wall surface at a tip end side of the recessed portion extends in the radial direction of the nozzle.

22. The replacement part unit for a plasma torch according to claim 1, further comprising:
an insulation ring including a hole into which the nozzle is inserted, the insulation ring being coupled to the nozzle by press-fitting or adhesion; and
a shield cap including a hole into which the insulation ring is inserted, the shield cap being coupled to the insulation ring by press-fitting or adhesion.

23. An insulation guide for a plasma torch including an electrode and a nozzle, the nozzle including a hole into which the insulation guide is inserted, the insulation guide comprising:
a hole configured for the electrode to be inserted therein;
a first coupling portion provided on an internal circumferential surface of the insulation guide and configured to be coupled to the electrode by press-fitting without an O-ring such that the internal circumferential surface of the insulation guide contacts an external circumferential surface of the electrode; and
a second coupling portion provided on an external circumferential surface of the insulation guide and configured to be coupled to the nozzle by press-fitting without an O-ring such that the external circumferential surface of the insulation guide contacts an internal circumferential surface of the nozzle,
the insulation guide being made of a resin material
the first coupling portion having a second protrusion formed on the internal circumferential surface of the insulation guide in a position closer to a base end of the insulation guide than to a tip end of the insulation guide in an axial direction of the insulation guide, the second protrusion extending in a circumferential direction of the insulation guide,
the insulation guide being configured to be coupled to the electrode by inserting a tip end of the electrode into the hole of the insulation guide such that a first protrusion provided on an external circumferential surface of the electrode passes by the second protrusion and the second protrusion becomes disposed between the first protrusion and a flange portion of the electrode, the first protrusion extending in the circumferential direction and having an outer diameter larger than an inner diameter of the second protrusion.

24. The insulation guide for a plasma torch according to claim 23, wherein
the resin material has a modulus of elasticity that is less than a modulus of elasticity of a ceramic.

25. The insulation guide for a plasma torch according to claim 23, wherein
the external circumferential surface of the insulation guide includes
a first external circumferential surface disposed inside the nozzle when the insulation guide is inserted into the nozzle, the first external circumferential surface including the second coupling portion, and
a second external circumferential surface positioned on a base end side of the first external circumferential surface and disposed outside of the nozzle when the insulation guide is inserted into the nozzle, and
a third external circumferential surface disposed on the base end side of the second external circumferential surface and having an outer diameter smaller than an outer diameter of the second external circumferential surface, and
the third external circumferential surface is disposed inside a gas channel of the plasma torch.

26. The insulation guide for a plasma torch according to claim 25, wherein
the second external circumferential surface includes a seal surface that comes into contact with an O-ring, and
a portion of the second external circumferential surface on a tip end side of the seal surface is disposed inside a cooling water channel of the plasma torch.

27. A nozzle for a plasma torch including an electrode and an insulation guide made of a resin material, the insulation guide including a hole into which the electrode is inserted, the nozzle comprising:
a first nozzle portion including a first hole into which the insulation guide is inserted and a third protrusion provided on an internal circumferential surface of the first nozzle portion, the first nozzle portion being configured to be coupled to the insulation guide by press-fitting without an O-ring such that an external circumferential surface of the insulation guide contacts the internal circumferential surface of the first nozzle portion;
a second nozzle portion including a second hole communicating with the first hole, the second nozzle portion being positioned on a tip end side of the first nozzle portion;
an inside step portion disposed between the internal circumferential surface of the first nozzle portion and an internal circumferential surface of the second nozzle portion; and
a third nozzle portion including a jetting hole communicating with the second hole and having an inner diameter less than an inner diameter of the second hole, the third nozzle portion being positioned on the tip end side of the second nozzle portion,
the third protrusion being disposed between a base end of the nozzle and the inside step portion, and
the nozzle being configured to be coupled to the insulation guide by inserting a tip end of the insulation guide into the first hole of the nozzle such that a fourth protrusion provided on an external circumferential surface of the insulation guide passes by the third protrusion and the fourth protrusion is disposed between the third protrusion and the inside step portion, the fourth protrusion extending in a circumferential direction of the insulation guide and having an outer diameter larger than an inner diameter of the third protrusion.

28. The nozzle for a plasma torch according to claim 27, wherein
the second nozzle portion has a thickness in a radial direction greater than a thickness of the first nozzle portion, and the second nozzle portion faces the electrode, and
the second nozzle portion is longer than the first nozzle portion as measured along an axial direction of the nozzle.

29. The nozzle for a plasma torch according to claim 27, wherein
a base end portion of the nozzle is configured to be disposed inside a cooling water channel of the plasma torch.

30. The nozzle for a plasma torch according to claim 27, wherein
an external circumferential surface of the nozzle includes a recessed portion that is recessed inward in a radial direction of the nozzle and extends in a circumferential direction of the nozzle.

31. The nozzle for a plasma torch according to claim 30, wherein
the recessed portion is disposed at approximately a same position as a tip end of the electrode along an axial direction of the nozzle.

32. The nozzle for a plasma torch according to claim 30, wherein
the nozzle is configured to be covered by a retainer cap of the plasma torch, the retainer cap having a hole that communicates with a water channel between an internal circumferential surface of the retainer cap and the external circumferential surface of the nozzle,
the recessed portion is disposed inside the cooling water channel, and
the recessed portion is disposed at approximately a same position as the hole of the retainer cap along an axial direction of the nozzle.

33. The nozzle for a plasma torch according to claim 32, wherein
a wall surface of a base end side of the recessed portion is inclined with respect to the radial direction of the nozzle and extends parallel to the internal circumferential surface of the retainer cap.

34. The nozzle for a plasma torch according to claim 30, wherein
a wall surface at the tip end side of the recessed portion extends in the radial direction of the nozzle.

35. The replacement part unit for a plasma torch according to claim 22, wherein
the plasma torch includes
a first retainer cap including an opening into which the replacement part unit is inserted, the first retainer cap being disposed so as to cover the nozzle, and
a second retainer cap including an opening into which the replacement part unit is inserted, the second retainer cap being disposed so as to cover the first retainer cap,
the nozzle or the shield cap includes a flange portion held by being clamped between an edge portion of an opening of the first retainer cap and an edge portion of an opening of the second retainer cap.

36. The replacement part unit for a plasma torch according to claim 1, wherein the nozzle has
- a first nozzle portion coupled to the insulation guide, an internal circumferential surface of the first nozzle portion including the internal circumferential surface of the nozzle that contacts the insulation guide,
- a second nozzle portion positioned on a tip end side of the first nozzle portion,
- an inside step portion disposed between the internal circumferential surface of the first nozzle portion and an internal circumferential surface of the second nozzle portion, and
- a third protrusion provided on the internal circumferential surface of the first nozzle portion, the third protrusion being disposed between a base end of the nozzle and the inside step portion, and the insulation guide has a fourth protrusion formed on the external circumferential surface of the insulation guide in a position closer to the tip end of the insulation guide than to the base end of the insulation guide, the fourth protrusion extending in the circumferential direction and having an outer diameter larger than an inner diameter of the third protrusion, the insulation guide being coupled to the nozzle by inserting the tip end of the insulation guide into the hole of the nozzle such that the fourth protrusion passes by the third protrusion and the fourth protrusion is disposed between the third protrusion and the inside step portion.

37. A replacement part unit for a plasma torch, the replacement part unit comprising:

an electrode;

an insulation guide including a hole into which the electrode is inserted, the insulation guide being made of a resin material and coupled to the electrode by press-fitting without an O-ring such that an internal circumferential surface of the insulation guide contacts an external circumferential surface of the electrode; and a nozzle coupled to the insulation guide by press-fitting without an O-ring such that an external circumferential surface of the insulation guide contacts an internal circumferential surface of the nozzle, the nozzle including
- a hole into which the insulation guide is inserted
- a first nozzle portion coupled to the insulation guide, an internal circumferential surface of the first nozzle portion including the internal circumferential surface of the nozzle that contacts the insulation guide,
- a second nozzle portion positioned on a tip end side of the first nozzle portion,
- an inside step portion disposed between the internal circumferential surface of the first nozzle portion and an internal circumferential surface of the second nozzle portion, and
- a third protrusion provided on the internal circumferential surface of the first nozzle portion, the third protrusion being disposed between a base end of the nozzle and the inside step portion, the insulation guide having a fourth protrusion formed on the external circumferential surface of the insulation guide in a position closer to a tip end of the insulation guide than to a base end of the insulation guide, the fourth protrusion extending in the circumferential direction and having an outer diameter larger than an inner diameter of the third protrusion, the insulation guide being coupled to the nozzle by inserting the tip end of the insulation guide into the hole of the nozzle such that the fourth protrusion passes by the third protrusion and the fourth protrusion is disposed between the third protrusion and the inside step portion.

* * * * *